US012627820B2

(12) United States Patent
Lin et al.

(10) Patent No.: US 12,627,820 B2
(45) Date of Patent: May 12, 2026

(54) DECODING METHOD AND ELECTRONIC DEVICE

(71) Applicant: HUAWEI TECHNOLOGIES CO., LTD., Shenzhen (CN)

(72) Inventors: Zehui Lin, Shenzhen (CN); Kangying Cai, Beijing (CN); Rong Wei, Shenzhen (CN); Yunneng Mo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/830,102

(22) Filed: Sep. 10, 2024

(65) Prior Publication Data

US 2024/0430459 A1     Dec. 26, 2024

Related U.S. Application Data

(63) Continuation of application No. PCT/CN2023/080096, filed on Mar. 7, 2023.

(30) Foreign Application Priority Data

Mar. 15, 2022    (CN) .......................... 202210255747.6

(51) Int. Cl.
*H04N 7/12*          (2006.01)
*H04N 7/01*          (2006.01)
(Continued)

(52) U.S. Cl.
CPC ............. *H04N 19/186* (2014.11); *H04N 7/01* (2013.01); *H04N 19/124* (2014.11);
(Continued)

(58) Field of Classification Search
CPC .................................................... H04N 19/186
See application file for complete search history.

(56) References Cited

U.S. PATENT DOCUMENTS 7,167,176 B2    1/2007  Sloan et al.
2003/0055641 A1*  3/2003  Yi .......................... G10L 13/06
                                                                704/238
(Continued)

FOREIGN PATENT DOCUMENTS

CN        114028804 A      2/2022
JP        2003163890 A     6/2003

OTHER PUBLICATIONS

M. H. Gross et al,"Two Methods for Wavelet-Based Volume Rendering",Computers and Graphics,Elsevier,GB,vol.21,No. 1,Jan. 1, 1997,XP000928981,total 16 pages.
(Continued)

*Primary Examiner* — Y Lee
(74) *Attorney, Agent, or Firm* — WOMBLE BOND DICKINSON (US) LLP

(57)     ABSTRACT

Embodiments of this application provide a decoding method and an electronic device. The method includes: obtaining a bitstream that includes intermediate data encoded by a second device; decoding the bitstream to obtain the intermediate data; and performing data form conversion, including domain conversion, on the intermediate data to obtain probe data. The probe data corresponds to one or more probes in a three-dimensional scene and is for determining a shading effect of an object in the three-dimensional scene in a rendering process.

18 Claims, 18 Drawing Sheets

(51) Int. Cl.

| | |
|---|---|
| *H04N 19/124* | (2014.01) |
| *H04N 19/136* | (2014.01) |
| *H04N 19/172* | (2014.01) |
| *H04N 19/186* | (2014.01) |

(52) U.S. Cl.
CPC ......... *H04N 19/136* (2014.11); *H04N 19/172* (2014.11); *G06T 2210/32* (2013.01)

(56) References Cited

U.S. PATENT DOCUMENTS

| | | | |
|---|---|---|---|
| 2007/0266042 A1* | 11/2007 | Hsu | G06Q 10/06 |
| | | | 707/999.102 |
| 2009/0089050 A1* | 4/2009 | Mo | G10L 19/005 |
| | | | 704/E11.001 |
| 2014/0092120 A1 | 4/2014 | Demos | |
| 2021/0012562 A1 | 1/2021 | Mcguire et al. | |

OTHER PUBLICATIONS

Luc Claustres et al,"Wavelet Encoding of BRDFs for Real-Time Rendering",Graphics Interface 2005: Proceedings,May 28, 2007,XP058334944,total 8 pages.

Michael Zollhoefer et al,"State of the Art on 3D Reconstruction with RGB-D Cameras",Computer Graphics Forum vol. 37,No. 2,May 1, 2018,XP055645281,total 28 pages.

C. Gasparakis,"Multi-resolution Multi-field Ray Tracing: A mathematical overview",Visualization (IEEE) (Visualization), Jan. 1, 1999,XP031172604,total 8 pages.

Michael Stengel et al:"A Distributed, Decoupled System for Losslessly Streaming Dynamic Light Probes to Thin Clients." arXiv:2103. 05875v1 [cs.DC] Mar. 10, 2021. total 13 pages.

Ari Silvennoinen and Peter-Pike Sloan :"Moving Basis Decomposition for Precomputed Light Transport." Eurographics Symposium on Rendering Jul. 15, 2021. total 11 pages.

Ko Nishino et al:"Clustered Blockwise PCA for Representing Visual Data." IEEE Transactions on Pattern Analysis and Machine Intelligence, vol. 27, No. 10, Oct. 2005. total 5 pages.

Zina H. Cigolle et al:"A Survey of Efficient Representations for Independent Unit Vectors." Journal of Computer Graphics Techniques vol. 3, No. 2, Apr. 17, 2014. total 30 pages.

Hideyoshi Yamanaka,"The Key Words I Want to Know, Episode 33, 4:4:4 and 4:2:0",Journal of Film and Video 1 Information Media Society, vol. 62, No. 10 (Oct. 2008), (Press) Video Information Media.la society, Oct. 1, 2008, with English translation total 15 pages.

* cited by examiner

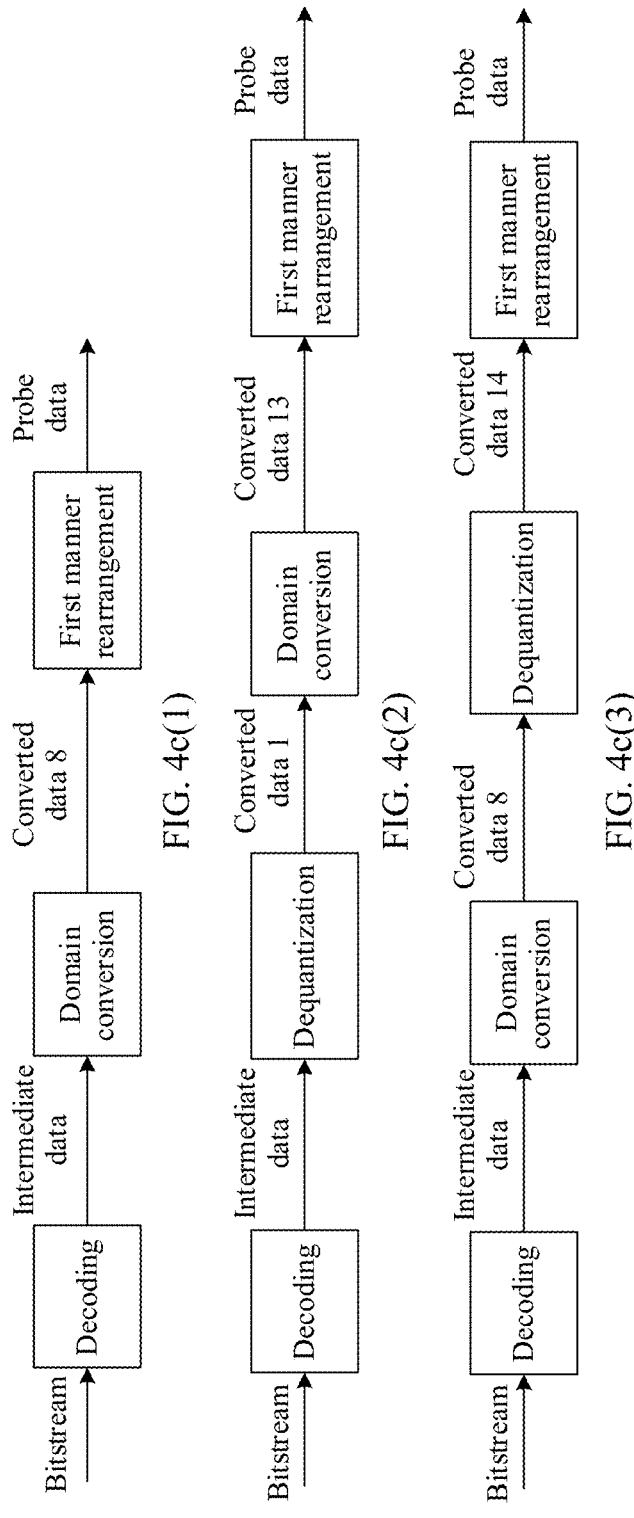
FIG. 4c(1)
FIG. 4c(2)
FIG. 4c(3)

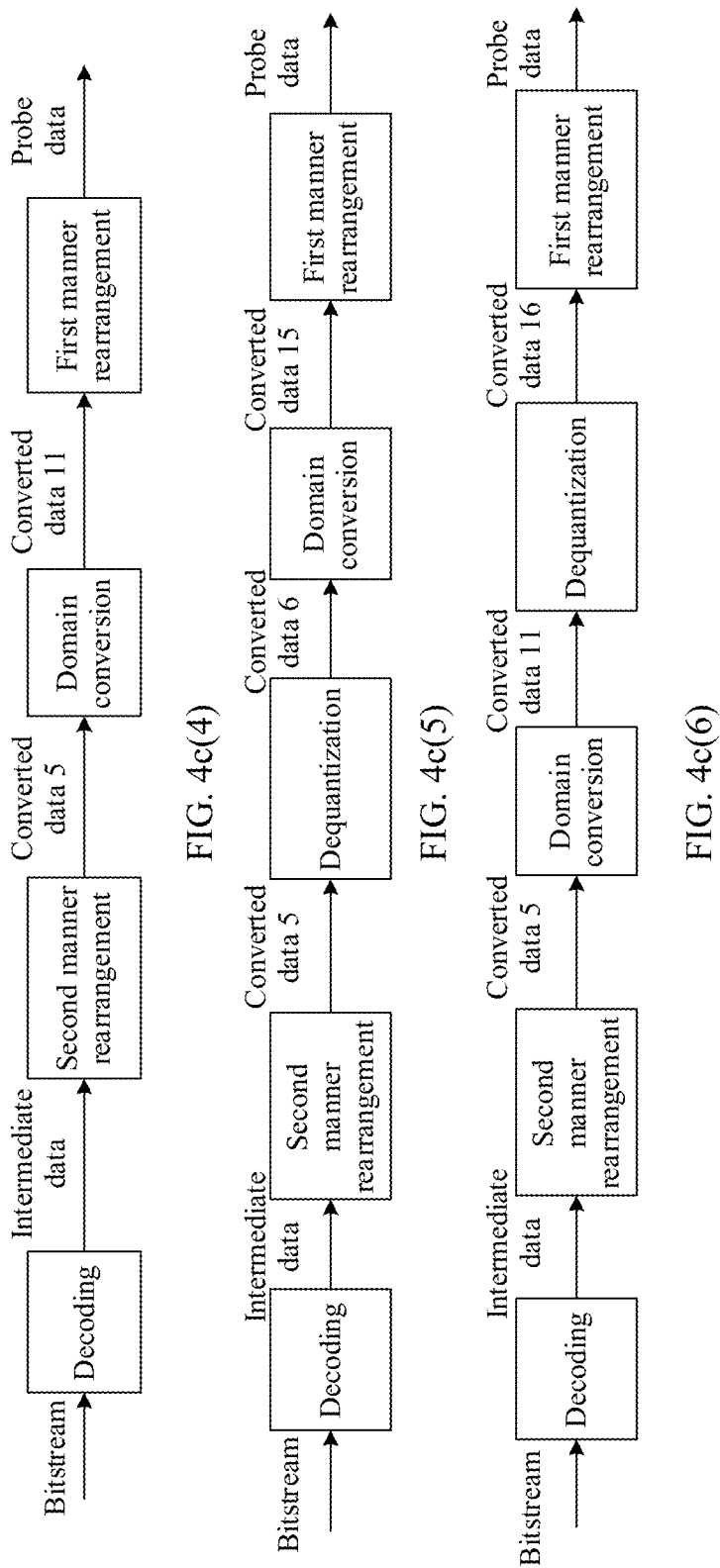
FIG. 4c(4)
FIG. 4c(5)
FIG. 4c(6)

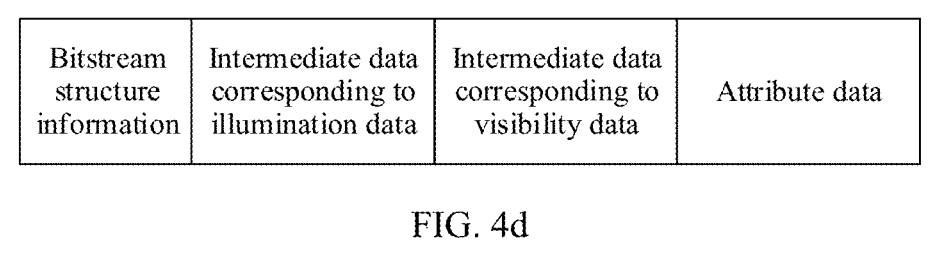

| Bitstream structure information | Intermediate data corresponding to illumination data | Intermediate data corresponding to visibility data | Attribute data |
|---|---|---|---|

FIG. 4d

DECODING METHOD AND ELECTRONIC DEVICE

CROSS-REFERENCE TO RELATED APPLICATIONS

This application is a continuation of International Application No. PCT/CN2023/080096, filed on Mar. 7, 2023, which claims priority to Chinese Patent Application No. 202210255747.6, filed on Mar. 15, 2022. The disclosures of the aforementioned applications are hereby incorporated by reference in their entireties.

TECHNICAL FIELD

Embodiments of this application relate to the encoding/decoding field, and in particular, to a decoding method and an electronic device.

BACKGROUND

As people gradually impose high requirements on quality of rendered images, a method of simulating shading effect in a rendering process gradually transits from simulation of shading effect of direct illumination (that is, simulating shading effect of a light ray reflected for one time) to simulation of shading effect of indirect illumination (that is, simulating shading effect of a light ray reflected for a plurality of times), to make an image more vivid. A probe is a manner of simulating shading effect of direct illumination.

Currently, in a device-cloud synergy scene, a cloud generates probe data, compresses the probe data, and sends the compressed probe data to a device side. After receiving a bitstream, the device side decompresses the bitstream, to obtain the probe data, and then computes, in a rendering process based on the probe data obtained through decoding, indirect shading effect generated by a light ray reflected by an object in a 3D (three-dimensional) scene.

SUMMARY

This application provides a decoding method and an electronic device. Compared with the conventional technology, the method in cooperation with a corresponding encoding method can reduce a bit rate under same rendering effect, or improve rendering effect under a same bit rate.

According to a first aspect, this application provides a decoding method. The decoding method includes: obtaining a bitstream, where the bitstream includes intermediate data encoded by a second device; decoding the bitstream, to obtain the intermediate data; and performing data form conversion on the intermediate data, to obtain probe data. The probe data corresponds to one or more probes in a three-dimensional scene, and the probe data is for determining shading effect of an object in the three-dimensional scene in a rendering process. The object in the three-dimensional scene corresponds to a three-dimensional model in the three-dimensional scene, the three-dimensional model may include a model of an object or a model of a person, and the data form conversion includes domain conversion. The second device performs data form conversion on the probe data, to achieve a lower bit rate under same rendering effect or better rendering effect under a same bit rate in comparison with the conventional technology. Therefore, the probe data is converted into a more compact representation form for compression, or a quantity of bits occupied by data of higher importance is increased in the bitstream in the rendering process for compression. In this case, a decoder of a first device can restore the probe data from the intermediate data through data form conversion, to subsequently determine the shading effect of the object in the three-dimensional scene in the rendering process based on the probe data. Therefore, in comparison with the conventional technology, when rendering effect at decoder sides is the same, a rendering delay at the decoder side in the method in this application is shorter; or when rendering delays of the decoder side are the same, rendering effect at the decoder side in the method in this application is better. Better rendering effect may mean that an image of a rendered picture enjoys a more accurate illumination color, more vivid brightness, less light leaks, and the like.

For example, the decoding method in this application may be applied to an N (N is an integer greater than 1)—end synergy rendering scene, for example, scenes such as a cloud game, a cloud exhibition, indoor decoration, a clothing design, and an architecture design. This is not limited in this application. The second device may be a server or a terminal, and the first device may be a terminal.

For example, the decoding method in this application is applied to a device-cloud synergy rendering scene. The second device is a server, and the first device is a terminal, for example, a terminal device like a personal computer, a mobile phone, or a VR (virtual reality) wearable device.

For example, the domain conversion may be converting a representation form of data from one domain to another domain. Domains may be classified from different perspectives based on requirements.

For example, from a perspective of whether normalization is performed, the domains may be classified into a normalized domain and a non-normalized domain.

From a perspective of a color space, the domains may be classified into an RGB domain, a YUV domain, an XYZ domain, and a Lab domain.

From a perspective of a numerical relationship, the domains may be classified into a linear domain and a non-linear domain. The non-linear domain may be, for example, an exponential domain, a PQ (perceptual quantizer) domain, or an HLG (hybrid log-gamma) domain.

From a perspective of a numerical representation form, the domains may be classified into a picture domain and a transform domain. For example, the picture domain may be a domain represented by a picture. For example, the transform domain may be a domain indicated by a transform basis function and a corresponding transform coefficient. For data $Y(t)$ in the transform domain, x transform bases $e\_1(t)$ to $e\_x(t)$ may be used to approximate the data $Y(t)$, so that the data $Y(t)$ is approximately equal to a sum of the x transform bases multiplied by corresponding transform coefficients. The transform basis includes but is not limited to a spherical harmonics function basis, a spherical wavelet basis, an eigenvector, and the like. This is not limited in this application.

For example, the RGB domain, the YUV domain, the XYZ domain, and the Lab domain respectively refer to a CIE 1931 RGB color space, aYUV color space (including variants such as YCbCr, YPbPr, and YCoCg), a CIE 1931 XYZ color space, and a CIELAB color space.

For example, any video decoding scheme may be used to decode the bitstream, to obtain the intermediate data corresponding to the probe data. For example, HEVC (high efficiency video coding) decoding may be performed on the bitstream, to obtain the intermediate data. For another example, AVC (advanced video coding) decoding may be performed on the bitstream, to obtain the intermediate data.

For another example, VVC (versatile video coding) decoding may be performed on the bitstream, to obtain the intermediate data. For another example, entropy decoding may be performed on the bitstream, to obtain the intermediate data. For another example, the intermediate data may be encoded in another video decoding scheme like an AVS (audio video coding standard), to obtain the corresponding bitstream. This is not limited in this application.

According to the first aspect, the performing data form conversion on the intermediate data, to obtain probe data includes: performing first processing on the intermediate data, to obtain converted data; and performing second processing on the converted data, to obtain the probe data, where when the first processing is the domain conversion, the second processing includes dequantization and/or first manner rearrangement; and when the second processing is the domain conversion, the first processing includes the dequantization and/or the first manner rearrangement. The second device performs data form conversion on the probe data in a manner of combining domain conversion and quantization and/or first manner rearrangement, to further reduce the bitstream. In this case, the decoder of the first device may also restore the probe data from the intermediate data in a manner of combining domain conversion and dequantization and/or first manner rearrangement.

It should be understood that when the decoder of the first device uses the manner of combining domain conversion and dequantization and/or first manner rearrangement, an execution sequence of domain conversion, dequantization, and first manner rearrangement is not limited, and a quantity of times of performing any one of domain conversion, dequantization, and rearrangement is not limited in this application either, provided that when an encoder of the second device uses the manner of combining domain conversion and quantization and/or first manner rearrangement, an execution sequence and quantities of times of domain conversion, quantization, and rearrangement of the second device correspond to the execution sequence and the quantities of times of domain conversion, dequantization, and first manner rearrangement of the first device.

For example, dequantization may be performed based on a quantization parameter. The quantization parameter may correspond to a quantization parameter used by the encoder of the second device to quantize the probe data.

For example, the converted data may include at least one of converted data 1 to converted data 17 in the following embodiments.

According to the first aspect or any one of the embodiments of the first aspect, the performing data form conversion on the intermediate data, to obtain probe data further includes: after the second processing is performed on the converted data and before the probe data is obtained, performing third processing on the converted data obtained through second processing, where the third processing includes at least one of the following: the domain conversion, the dequantization, or the first manner rearrangement. The second device performs data form conversion on the probe data in a manner of combining domain conversion and quantization and/or first manner rearrangement, to further reduce the bitstream. In this case, the decoder of the first device may also restore the probe data from the intermediate data in a manner of combining domain conversion and dequantization and/or first manner rearrangement.

According to the first aspect or any one of the embodiments of the first aspect, the intermediate data is data on a YUV plane, and before the performing first processing on the intermediate data, the method further includes: performing second manner rearrangement on the intermediate data, where the second manner rearrangement includes extracting data from the YUV plane. The second device uses a combination of different rearrangement manners, to make arrangement of the probe data more compact, so as to further reduce the bitstream. In this case, the decoder of the first device may also use a combination of different rearrangement manners, to restore the probe data from the intermediate data.

It should be noted that, when the intermediate data is not data on the YUV plane, the operation of performing second manner rearrangement on the intermediate data may not be performed.

According to the first aspect or any one of the embodiments of the first aspect, the second manner rearrangement further includes arranging the data extracted from the YUV plane into a two-dimensional picture.

It should be noted that, when the data extracted from the YUV plane is the transform basis and the transform coefficient, the second manner rearrangement may not include arranging the data extracted from the YUV plane into a two-dimensional picture.

According to the first aspect or any one of the embodiments of the first aspect, when the intermediate data is intermediate data corresponding to illumination data, the first manner rearrangement includes at least one of the following: adding a channel to the intermediate data corresponding to the illumination data, converting the intermediate data corresponding to the illumination data into a data storage format of the first device, or performing dimension conversion on the intermediate data corresponding to the illumination data.

It should be noted that "the intermediate data corresponding to the illumination data" in "converting the intermediate data corresponding to the illumination data into a data storage format of the first device" may be original intermediate data, in the bitstream, corresponding to the illumination data, or intermediate data corresponding to the illumination data obtained through domain conversion, or intermediate data corresponding to dequantized illumination data, or intermediate data corresponding to the illumination data to which a channel is added, or intermediate data corresponding to the illumination data obtained through dimension conversion.

It should be noted that "the intermediate data corresponding to the illumination data" in "performing dimension conversion on the intermediate data corresponding to the illumination data" may be original intermediate data, in the bitstream, corresponding to the illumination data, or intermediate data corresponding to the illumination data obtained through domain conversion, or intermediate data corresponding to dequantized illumination data, or intermediate data corresponding to the illumination data to which a channel is added, or intermediate data corresponding to the illumination data whose data format is converted into the data storage format of the first device.

For example, the intermediate data may be a matrix. For example, the dimension conversion may be changing a size of the matrix. For example, the intermediate data is a matrix with a size of 50*60*100, and the intermediate data may be converted into a matrix with a size of 100*1000*3 through dimension conversion. For another example, the intermediate data is a matrix with a size of 190*190*3, the intermediate data may be converted into a matrix with a size of 150*240*3 through dimension conversion, and redundant invalid data is discarded.

According to the first aspect or any one of the embodiments of the first aspect, when the intermediate data is intermediate data corresponding to visibility data, and the intermediate data corresponding to the visibility data includes a plurality of groups of channels, the first manner rearrangement includes at least one of the following: combining the plurality of groups of channels, converting the intermediate data corresponding to the visibility data into a data storage format of the first device, or performing dimension conversion on the intermediate data corresponding to the visibility data.

It should be noted that "the intermediate data corresponding to the visibility data" in "converting the intermediate data corresponding to the visibility data into a data storage format of the first device" may be original intermediate data, in the bitstream, corresponding to the visibility data, or intermediate data corresponding to the visibility data obtained through domain conversion, or intermediate data corresponding to dequantized visibility data, or intermediate data corresponding to the visibility data to which a channel is added, or intermediate data corresponding to the visibility data obtained through dimension conversion.

It should be noted that "the intermediate data corresponding to the visibility data" in "performing dimension conversion on the intermediate data corresponding to the visibility data" may be original intermediate data, in the bitstream, corresponding to the visibility data, or intermediate data corresponding to the visibility data obtained through domain conversion, or intermediate data corresponding to dequantized visibility data, or intermediate data corresponding to the visibility data to which a channel is added, or intermediate data corresponding to the visibility data whose data format is converted into the data storage format of the first device.

It should be noted that combining the plurality of groups of channels means combining the plurality of groups of channels into one group of channels. Before the plurality of groups of channels are combined, each group of channels includes at least one channel, and a quantity of channels in one group of channels obtained by combining the plurality of groups of channels is equal to a total quantity of channels in the plurality of groups of channels before the combination.

According to the first aspect or any one of the embodiments of the first aspect, the performing data form conversion on the intermediate data, to obtain probe data includes: performing data form conversion on the intermediate data based on first attribute data obtained by decoding the bitstream, to obtain the probe data. Therefore, the decoder of the first device may perform data form conversion on the intermediate data based on information parsed from the bitstream.

For example, the decoder of the first device may alternatively obtain, in advance, information related to data form conversion performed by the encoder of the second device in an encoding process. After the intermediate data is obtained from the bitstream through decoding, data form conversion may be performed on the intermediate data based on the information that is obtained in advance and that is related to data form conversion performed by the encoder of the second device in the encoding process.

According to the first aspect or any one of the embodiments of the first aspect, the first attribute data includes at least one of the following: a quantization parameter, a domain conversion parameter, and a rearrangement parameter.

For example, the domain conversion parameter may include a normalization parameter, an exponential conversion parameter, a PQ conversion parameter, an HLG conversion parameter, and a color space conversion parameter. This is not limited in this application.

According to the first aspect or any one of the embodiments of the first aspect, the domain conversion includes at least one of the following: conversion from a normalized domain to a non-normalized domain, conversion from a non-linear domain to a linear domain, conversion from a YUV domain to an RGB domain, conversion from an XYZ domain to an RGB domain, and conversion from a Lab domain to an RGB domain.

According to the first aspect or any one of the embodiments of the first aspect, the bitstream further includes attribute data, encoded by the second device, of the probe, where the attribute data includes the first attribute data for data form conversion and/or second attribute data used in the rendering process.

According to the first aspect or any one of the embodiments of the first aspect, when the intermediate data includes the intermediate data corresponding to the illumination data and the intermediate data corresponding to the visibility data, the bitstream further includes bitstream structure information, where the bitstream structure information includes a location of the intermediate data corresponding to the illumination data and/or a location of the intermediate data corresponding to the visibility data.

For example, the bitstream structure information may include but is not limited to: a quantity of probes, the location, a length, and a data format of the intermediate data corresponding to the illumination data, an execution sequence of data form conversion types corresponding to the illumination data, the location, a length, and a data format of the intermediate data corresponding to the visibility data, an execution sequence of data form conversion types corresponding to the visibility data, a location, a length, and a data format of the first attribute data, and a location, a length, and a data format of the second attribute data. This is not limited in this application. The data form conversion types may include various data form conversion types used by the second device during encoding, for example, encoding-side operation types (for example, discarding data of some channels, channel splitting, precision conversion, and dimension conversion) corresponding to various first manner rearrangement types, various normalization types (for example, maximum value normalization, fixed parameter normalization, min-max normalization, and z-score (standard score) normalization), various domain conversion types (for example, conversion from a linear domain to a non-linear domain, conversion from an RGB domain to a YUV domain, conversion from an RGB domain to an XYZ domain, conversion from an RGB domain to a Lab domain, and conversion from a picture domain to a transform domain), and various quantization types (for example, uniform quantization and non-uniform quantization). The second manner rearrangement type includes a second rearrangement type, for example, padding to the YUV plane, used by the second device during encoding. This is not limited in this application.

According to the first aspect or any one of the embodiments of the first aspect, when the intermediate data includes the intermediate data corresponding to the illumination data and the intermediate data corresponding to the visibility data, the probe data includes the illumination data and/or the visibility data.

For example, the illumination data may be for describing emergent illumination of an object around the probe.

For example, the visibility data may be for describing distribution (which may also be referred to as depth distribution) of distances between objects around the probe and the probe, and may include but is not limited to distance data, a variance of the distance data, a square of the distance data, and the like. This is not limited in this application.

According to a second aspect, this application provides a first electronic device. The electronic device includes:

a bitstream obtaining module, configured to obtain a bitstream, where the bitstream includes intermediate data encoded by a second device;

a decoding module, configured to decode the bitstream, to obtain the intermediate data; and a data form conversion module, configured to perform data form conversion on the intermediate data, to obtain probe data, where the probe data corresponds to one or more probes in a three-dimensional scene, and the probe data is for determining shading effect of an object in the three-dimensional scene in a rendering process, where the data form conversion includes domain conversion.

According to the second aspect, the data form conversion module includes:

a domain conversion module, configured to: perform first processing on the intermediate data, to obtain converted data, where the first processing is domain conversion; or perform second processing on the converted data, to obtain the probe data, where the second processing is the domain conversion;

a dequantization module, configured to: perform first processing on the intermediate data, to obtain converted data, where the first processing is dequantization; or perform second processing on the converted data, to obtain the probe data, where the second processing is dequantization; and a rearrangement module, configured to: perform first processing on the intermediate data, to obtain converted data, where the first processing is first manner rearrangement; or perform second processing on the converted data, to obtain the probe data, where the second processing is first manner rearrangement.

According to the second aspect or any one of the embodiments of the second aspect, the domain conversion module is further configured to: after the second processing is performed on the converted data and before the probe data is obtained, perform third processing on the converted data obtained through second processing, where the third processing is the domain conversion.

The dequantization module is further configured to: after the second processing is performed on the converted data and before the probe data is obtained, perform third processing on the converted data obtained through second processing, where the third processing is the dequantization.

The rearrangement module is further configured to: after the second processing is performed on the converted data and before the probe data is obtained, perform third processing on the converted data obtained through second processing, where the third processing is the first manner rearrangement.

According to the second aspect or any one of the embodiments of the second aspect, the intermediate data is data on a YUV plane, the rearrangement module is further configured to: before first processing is performed on the intermediate data, perform second manner rearrangement on the intermediate data, where the second manner rearrangement includes extracting data from the YUV plane.

According to the second aspect or any one of the embodiments of the second aspect, the second manner rearrangement further includes arranging the data extracted from the YUV plane into a two-dimensional picture.

According to the second aspect or any one of the embodiments of the second aspect, when the intermediate data is intermediate data corresponding to illumination data, the first manner rearrangement includes at least one of the following: adding a channel to the intermediate data corresponding to the illumination data, converting the intermediate data corresponding to the illumination data into a data storage format of the first device, or performing dimension conversion on the intermediate data corresponding to the illumination data.

According to the second aspect or any one of the embodiments of the second aspect, when the intermediate data is intermediate data corresponding to visibility data, and the intermediate data corresponding to the visibility data includes a plurality of groups of channels, the first manner rearrangement includes at least one of the following: combining the plurality of groups of channels, converting the intermediate data corresponding to the visibility data into a data storage format of the first device, or performing dimension conversion on the intermediate data corresponding to the visibility data.

According to the second aspect or any one of the embodiments of the second aspect, the data form conversion module is configured to perform data form conversion on the intermediate data based on first attribute data obtained by decoding the bitstream, to obtain the probe data.

According to the second aspect or any one of the embodiments of the second aspect, the first attribute data includes at least one of the following: a quantization parameter, a domain conversion parameter, and a rearrangement parameter.

According to the second aspect or any one of the embodiments of the second aspect, the domain conversion includes at least one of the following: conversion from a normalized domain to a non-normalized domain, conversion from a non-linear domain to a linear domain, conversion from a YUV domain to an RGB domain, conversion from an XYZ domain to an RGB domain, and conversion from a Lab domain to an RGB domain.

According to the second aspect or any one of the embodiments of the second aspect, the bitstream further includes attribute data, encoded by the second device, of the probe, where the attribute data includes the first attribute data for data form conversion and/or second attribute data used in the rendering process.

According to the second aspect or any one of the embodiments of the second aspect, when the intermediate data includes the intermediate data corresponding to the illumination data and the intermediate data corresponding to the visibility data, the bitstream further includes bitstream structure information, where the bitstream structure information includes a location of the intermediate data corresponding to the illumination data and/or a location of the intermediate data corresponding to the visibility data.

According to the second aspect or any one of the embodiments of the second aspect, when the intermediate data includes the intermediate data corresponding to the illumination data and the intermediate data corresponding to the visibility data, the probe data includes the illumination data and/or the visibility data.

The second aspect and any one of the embodiments of the second aspect respectively correspond to the first aspect and any one of the embodiments of the first aspect. For technical effect corresponding to the second aspect and any one of the embodiments of the second aspect, refer to technical effect corresponding to the first aspect and any one of the embodiments of the first aspect. Details are not described herein again.

According to a third aspect, an embodiment of this application provides an electronic device, including a memory and a processor. The memory is coupled to the processor, the memory stores program instructions, and when the program instructions are executed by the processor, the electronic device is enabled to perform the decoding method in the first aspect or any one of the embodiments of the first aspect.

The third aspect and any one of the embodiments of the third aspect respectively correspond to the first aspect and any one of the embodiments of the first aspect. For technical effect corresponding to the third aspect and any one of the embodiments of the third aspect, refer to technical effect corresponding to the first aspect and any one of the embodiments of the first aspect. Details are not described herein again.

According to a fourth aspect, an embodiment of this application provides a chip, including one or more interface circuits and one or more processors. The interface circuit is configured to: receive a signal from a memory of an electronic device, and send the signal to the processor, where the signal includes computer instructions. When the processor executes the computer instructions, the electronic device is enabled to perform the decoding method in the first aspect or any one of the embodiments of the first aspect.

The fourth aspect and any one of the embodiments of the fourth aspect respectively correspond to the first aspect and any one of the embodiments of the first aspect. For technical effect corresponding to the fourth aspect and any one of the embodiments of the fourth aspect, refer to technical effect corresponding to the first aspect and any one of the embodiments of the first aspect. Details are not described herein again.

According to a fifth aspect, an embodiment of this application provides a computer-readable storage medium. The computer-readable storage medium stores a computer program, and when the computer program is run on a computer or a processor, the computer or the processor performs the decoding method in the first aspect or any one of the embodiments of the first aspect.

The fifth aspect and any one of the embodiments of the fifth aspect respectively correspond to the first aspect and any one of the embodiments of the first aspect. For technical effect corresponding to the fifth aspect and any one of the embodiments of the fifth aspect, refer to technical effect corresponding to the first aspect and any one of the embodiments of the first aspect. Details are not described herein again.

According to a sixth aspect, an embodiment of this application provides a computer program product. The computer program product includes a software program, and when the software program is executed by a computer or a processor, the computer or the processor performs the decoding method in the first aspect or any one of the embodiments of the first aspect.

The sixth aspect and any one of the embodiments of the sixth aspect respectively correspond to the first aspect and any one of the embodiments of the first aspect. For technical effect corresponding to the sixth aspect and any one of the embodiments of the sixth aspect, refer to technical effect corresponding to the first aspect and any one of the embodiments of the first aspect. Details are not described herein again.

According to a seventh aspect, this application provides a computer-readable storage medium storing a bitstream. When the bitstream is decoded by using the decoding method in the first aspect and any one of the embodiments of the first aspect, probe data may be obtained.

The seventh aspect and any one of the embodiments of the seventh aspect respectively correspond to the first aspect and any one of the embodiments of the first aspect. For technical effect corresponding to the seventh aspect and any one of the embodiments of the seventh aspect, refer to technical effect corresponding to the first aspect and any one of the embodiments of the first aspect. Details are not described herein again.

According to an eighth aspect, this application provides a bitstream. When the bitstream is decoded by using the decoding method in the first aspect and any embodiment of the first aspect, probe data may be obtained. In one embodiment, the bitstream may be stored in a computer-readable storage medium, or may be transmitted in a form of an electromagnetic signal.

The eighth aspect and any one of the embodiments of the eighth aspect respectively correspond to the first aspect and any one of the embodiments of the first aspect. For technical effect corresponding to the eighth aspect and any one of the embodiments of the eighth aspect, refer to technical effect corresponding to the first aspect and any one of the embodiments of the first aspect. Details are not described herein again.

BRIEF DESCRIPTION OF DRAWINGS

FIG. 4c(1) to FIG. 4c(6) are a diagram of an example of a decoding procedure;

FIG. 4d is a diagram of an example of a structure of a bitstream;

DESCRIPTION OF EMBODIMENTS

Figure 1A:
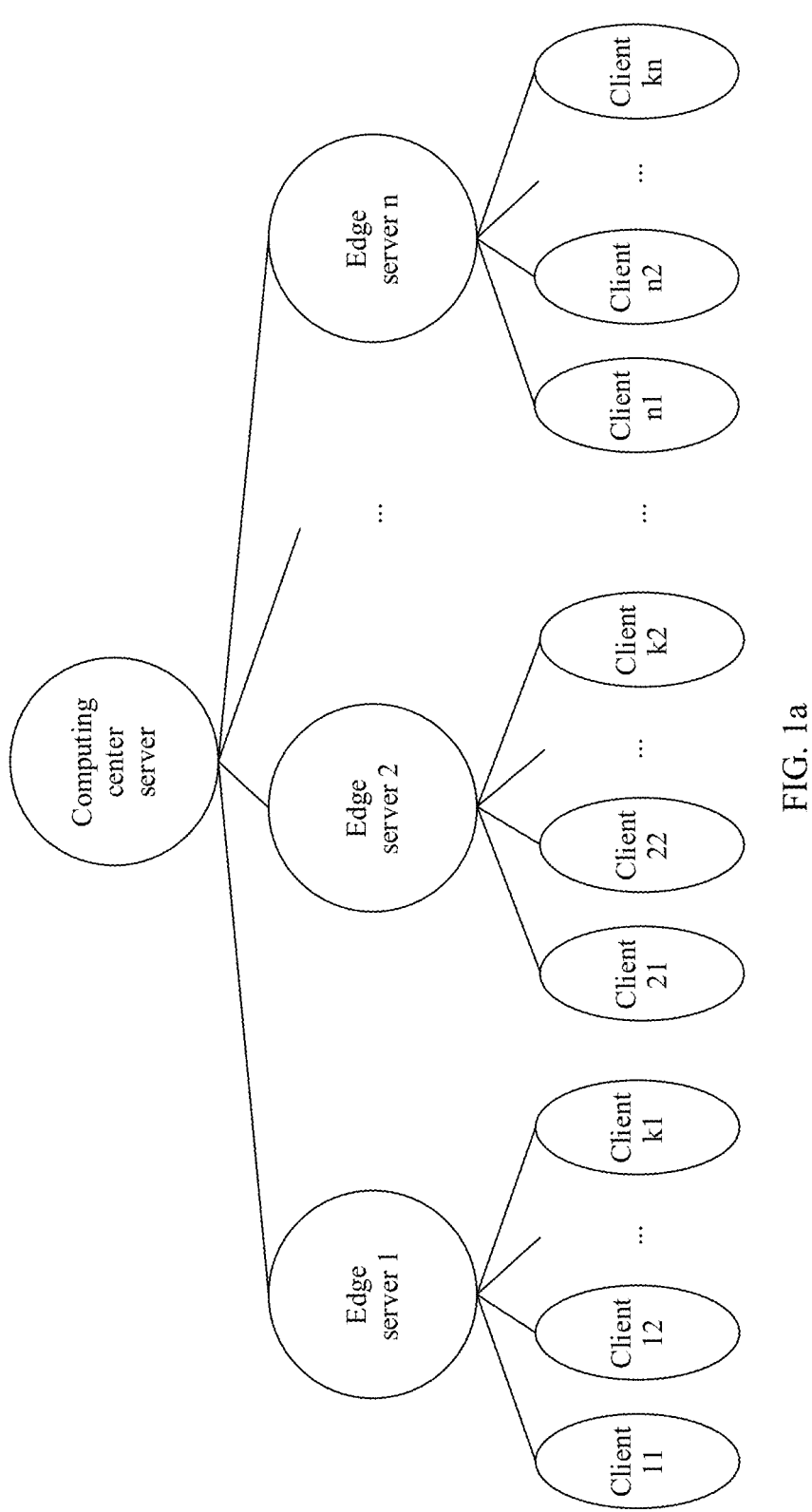
FIG. 1a is a diagram of an example of a system framework.

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art according to embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object, a second target object, and the like are for distinguishing between different target objects, but are not for describing an order of the target objects.

In embodiments of this application, a word such as "example" or "for example" is for giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a particular manner.

In descriptions about embodiment of this application, unless otherwise stated, "a plurality of" means two or more than two. For example, a plurality of processing units mean two or more processing units, and a plurality of systems mean two or more systems.

For example, embodiments of this application may be applied to an N-end (namely, N devices) synergy rendering scene, where N is an integer greater than 1.

In a possible scene, one device may generate rendering input information (the rendering input information may include one or more of a three-dimensional model (which may also be referred to as a 3D (three-dimensional) object model, including a model of a person and/or a model of an object), probe data, and the like, which is not limited in this application, and an example in which the rendering input information is the probe data is used for description in this application), and then distribute the probe data to other N-1 devices. After receiving the probe data, the other N-1 devices may determine shading effect of an object (corresponding to the three-dimensional model) in the three-dimensional scene based on the probe data in a rendering process. After rendering is completed, a rendered picture may be obtained.

In a possible scene, N1 (a value of N1 ranges from 2 to N, where N1 may be equal to 2 or N, and N1 is an integer) devices may synergically generate the probe data, where each of the N1 devices generates a portion of the probe data. Then, each of the N1 devices distributes the portion of the probe data generated by the device to the other N-1 devices. After receiving the probe data, the N1 devices may determine, in a rendering process, shading effect of an object in the three-dimensional scene based on the received probe data and portions of probe data generated by the N1 devices. After rendering is completed, a rendered picture may be obtained. After receiving the probe data, the other N-N1 devices may determine shading effect of the object in the three-dimensional scene based on the received probe data in the rendering process. After rendering is completed, a rendered picture may be obtained.

For ease of description, the device that is for rendering and that determines shading effect of the object in the three-dimensional scene based on the probe data in the rendering process may be referred to as a first device, and the device that generates the probe data in the N-end synergy rendering scene may be referred to as a second device. Any device may be the first device or the second device. This is not limited in this application. The second device may be a server or a terminal, and the first device may be a terminal.

FIG. 1a is a diagram of an example of a system framework. In an embodiment in FIG. 1a, the second device is a computing center server disposed on a cloud, and the first device is a client. FIG. 1a is a diagram of an example of a framework of a device-cloud synergy rendering system.

Refer to FIG. 1a. For example, the device-cloud synergy rendering system may include the computing center server, an edge server, and the client. There may be n (n is an integer greater than 1) edge servers, and there may be k1+k2+ . . . +kn clients, where k1, k2, . . . , and kn are all positive integers. The computing center server is connected to the n edge servers, and each edge server is connected to at least one client. As shown in FIG. 1a, an edge server 1 is connected to k1 clients: a client 11, a client 12, . . . , and a client k1; an edge server 2 is connected to k2 clients: a client 21, a client 22, . . . , and a client k2; . . . ; and an edge server n is connected to kn clients: a client n1, a client n2, . . . , and a client kn.

For example, the client may access a network via a wireless access point like a base station or a Wi-Fi access point, and communicate with the edge server over the network, or the client may communicate with the edge server through a wired connection. Alternatively, the edge server may access a network via a wireless access point like a base station or a Wi-Fi access point, and communicate with the computing center server over the network, or the edge server may communicate with the computing center server through a wired connection.

For example, the computing center server may be one server, or may be a server cluster including a plurality of servers, or may be another distributed system. This is not limited in this application.

For example, a quantity n of edge servers is not limited in this application, and may be set based on an actual application scenario. This is not limited in this application. In a possible scenario, the client may be directly connected to the computing center server, and some clients may be directly connected to the computing center server instead of being connected to the edge server. In another possible scenario, all clients are directly connected to the computing center server instead of being connected to the edge server.

For example, a quantity of clients connected to each edge server is not limited in this application, and may be set based on an actual application scenario. In addition, quantities of clients connected to the edge servers may be the same or may be different (that is, k1, k2, . . . , and kn may be equal or different), and may be set based on an actual application scenario. This is not limited in this application.

For example, the client may include but is not limited to: a mobile phone, a personal computer (PC), a notebook computer, a tablet computer, a smart television, a mobile Internet device (MID), a wearable device (for example, a smartwatch, smart glasses, or a smart helmet), a virtual reality (VR) device, an augmented reality (AR) device, a wireless electronic device in industrial control, a wireless electronic device in self-driving, a wireless electronic device in remote medical surgery, a wireless electronic device in a smart grid, a wireless electronic device in transportation safety, a wireless electronic device in a smart city, a wireless electronic device in a smart home, and the like. A form of the client is not limited in the following embodiments.

It should be understood that the framework of the device-cloud synergy rendering system shown in FIG. 1a is merely an example of a framework of the device-cloud synergy rendering system in this application. In the device-cloud synergy rendering system in this application, a computing center server and an edge server may be a same server. Alternatively, in the device-cloud synergy rendering system in this application, no edge server is included, but a computing center server is connected to each client. This is not limited in this application. This application is described by using the framework of the device-cloud synergy rendering system shown in FIG. 1a as an example.

For example, the computing center service may be configured to generate probe data, for example, generating probe data shared by all clients and personalized probe data of each client.

For example, the edge server may be configured to distribute probe data, and generate personalized probe data of the client connected to the edge server. For example, when the computing center server generates the probe data shared by all clients and the personalized probe data of each client, the edge server may distribute the probe data generated by the computing center server. For another example, when the computing center server generates only the probe data shared by all clients, the edge server may generate the personalized probe data of the client connected to the edge server, and distribute the probe data generated by the computing center server and the probe data generated by the edge server.

For example, the client may be configured to perform rendering and display a rendered picture. In a rendering process, shading effect of an object in a three-dimensional scene may be determined based on the probe data.

For example, N-end synergy rendering scenes such as a cloud game, a cloud exhibition, indoor decoration, a clothing design, and an architecture design may be implemented by using the framework of the device-cloud synergy rendering system shown in FIG. 1a.

For example, in the cloud game scene, after receiving a field of view switching instruction sent by the client 11, the computing center server may generate probe data of a game scene corresponding to a target field of view, and send the probe data to the edge server 1. The edge server 1 sends the probe data to the client 11. After receiving the probe data, the client 11 may perform rendering, and determine shading effect of an object in the game scene corresponding to the target field of view. After rendering is completed, a picture of the game scene corresponding to the target field of view may be obtained for display.

For example, in the indoor decoration scene, after receiving a furniture addition indication sent by the client 21, the computing center server may generate probe data corresponding to a living room scene to which target furniture is added, and send the probe data to the edge server 2. The edge server 2 sends the probe data to the client 21. After receiving the probe data, the client 21 may perform rendering, and determine shading effect of an object in the living room scene to which the target furniture is added. After rendering is completed, a picture of the living room to which the target furniture is added may be obtained for display.

For ease of subsequent description, the following describes a process in which the computing center server generates probe data and a process in which the client determines shading effect of an object in a three-dimensional scene based on the probe data in a rendering process.

The process in which the computing center server generates the probe data is as follows:

For example, a rendering process of the computing center server may be as follows: loading a three-dimensional model (which may include a model of a person or a model of an object) to a three-dimensional scene (which may also be referred to as a 3D scene) (in this way, the three-dimensional model may be converted into an object in the three-dimensional scene); and rendering the object in the three-dimensional scene, to obtain a current frame (namely, a rendered picture). In a process of rendering the object in the three-dimensional scene, a plurality of probes may be placed in the three-dimensional scene, and the probes are used to detect an ambient environment, to obtain probe data. Then, shading effect of the object in the three-dimensional scene is determined based on the probe data. This can simulate shading effect of the object in the three-dimensional scene after a light ray in the three-dimensional scene is reflected for a plurality of times.

Figure 1B:
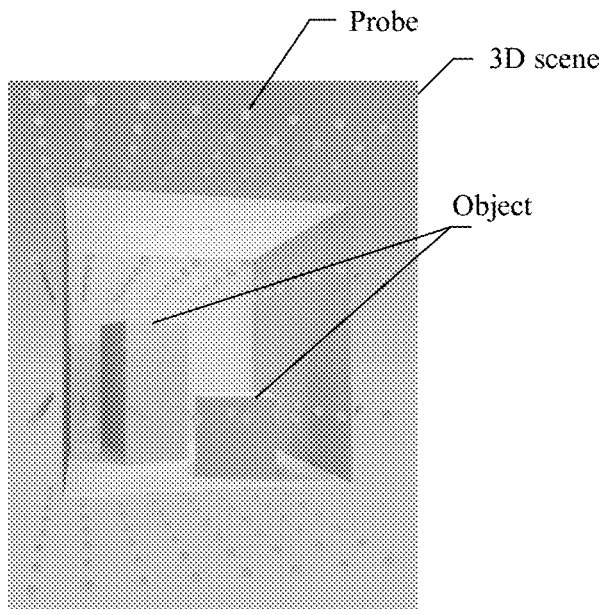
FIG. 1b is a diagram of an example of probe distribution in a three-dimensional scene.

FIG. 1b is a diagram of an example of probe distribution in a three-dimensional scene. Each small ball in FIG. 1b represents a probe. In an embodiment in FIG. 1b, the probe is a DDGI (Dynamic Diffuse Global Illumination, dynamic diffuse global illumination) probe.

Refer to FIG. 1b. For example, a location at which each probe is placed in the three-dimensional scene and a location relationship between each probe and another probe may be set based on a requirement. This is not limited in this application. For example, in FIG. 1b, distances between each probe and six probes in six directions (the right above direction, the right below direction, the right front direction, the right rear direction, the right left direction, and the right right direction) around the probe are equal. In addition, a quantity of probes placed in the three-dimensional scene may also be set based on a requirement. This is not limited in this application either.

After the plurality of probes are placed in the three-dimensional scene, corresponding attribute data (the attribute data is used in the rendering process) may be configured for each probe based on a scene requirement. The attribute data includes but is not limited to: a type of the probe (for example, a reflection probe or a DDGI probe), an enabling identifier of the probe, a location of the probe, a location offset of the probe (for example, after the probe is placed in a preset manner, initial locations of probes may be obtained; and locations of some probes may be adjusted to obtain better shading effect, where for the probes, offsets between the adjusted locations and the initial locations may be referred to as location offsets of the probe, for example, after the probes are placed in the manner shown in FIG. Tb, distances between each probe and six probes around the probe are equal; and if a location of a probe is adjusted, distances between the probe and six probes around the probe are unequal), and the like. This is not limited in this application.

For example, after the plurality of probes are placed in the three-dimensional scene, each probe may detect an ambient environment centered on the probe, that is, detecting features of a surrounding object centered on the probe in the three-dimensional scene, and record the features as environment data of the probe. The environment data may include illumination data, color data, visibility data, a normal direction, texture coordinates, material information, and the like. The illumination data may be for describing emergent illumination of the object around the probe. The visibility data may be for describing distribution (which may also be referred to as depth distribution) of distances between objects around the probe and the probe, and may include but is not limited to distance data, a variance of the distance data, a square of the distance data, and the like. This is not limited in this application. The following provides an example for description by using an example of generating the illumination data and the visibility data.

For example, a DDGI algorithm may be used to generate illumination data and visibility data corresponding to each probe. The following uses a probe in a current frame as an example to describe a process of generating the illumination data and the visibility data of the probe. First, several light rays emitted from the probe are sampled, and first intersection points of the several light rays and objects in the three-dimensional scene are calculated. Then, a distance between the probe and the first intersection point of each of the several light rays of the probe and the objects in the three-dimensional scene is calculated, to obtain initial distance data. Illumination at the first intersection point of the several light rays and the objects in the three-dimensional scene is calculated, to obtain initial illumination data. Then, the discrete initial distance data may be converted into continuous spherical data. In one embodiment, filtering processing may be performed on the initial distance data according to a cos^k kernel function (k is a positive integer) on a spherical surface, to obtain candidate distance data. In addition, the discrete initial distance data may be converted into the continuous spherical data. In one embodiment, filtering processing may be performed on a square of the initial distance data according to a cos^k kernel function (k is a positive integer) on the spherical surface, to obtain a square of the candidate distance data. In addition, the discrete initial illumination data may be converted into continuous spherical data. In one embodiment, filtering processing may be performed on the initial illumination data according to a cos kernel function on the spherical surface, to obtain candidate illumination data. Then, weighted calculation is performed on the candidate distance data of the probe and distance data of the probe in a previous frame, to obtain distance data of the probe in the current frame. Weighted calculation is performed on the square of the candidate distance data of the probe and a square of the distance data of the probe in the previous frame, to obtain a square of the distance data of the probe in the current frame. Weighted calculation is performed on the candidate illumination data of the probe and illumination data of the probe in the previous frame, to obtain illumination data of the probe in the current frame. In this way, illumination data and visibility data of all probes in the current frame can be obtained.

For example, both the illumination data and the visibility data of each probe may be represented by a two-dimensional picture, or may be represented by a spherical harmonics function basis coefficient, or may be represented by a spherical wavelet basis coefficient. This is not limited in this application.

It should be noted that, it is assumed that the three-dimensional scene includes M (M is a positive integer) probes. M1 probes have any one of illumination data, visibility data, and attribute data, M2 probes have any two of illumination data, visibility data, and attribute data, M3 probes have illumination data, visibility data, and attribute data, and M4 probes do not have probe data. M1+M2+M3+M4=M, where M1, M2, M3, and M1 are all integers, and values of M1, M2, M3, and M4 may be set based on a requirement. This is not limited in this application.

The process in which the client determines shading effect of the object in the three-dimensional scene based on the probe data in the rendering process is as follows:

For example, the probe data may be for calculating the shading effect of the object in the three-dimensional scene in the rendering process of the client. In one embodiment, when each pixel is rendered, coordinates of a 3D space corresponding to the pixel are obtained, and eight probes around the coordinates are searched for. Then, a weight contributed by each probe to the pixel is calculated based on the visibility data of the probe, that is, whether the probe and the 3D coordinates of the probe are mutually visible is determined based on a distance. If the probe and the 3D coordinates of the probe are not mutually visible, the weight is 0. If the probe and the 3D coordinates of the probe are mutually visible, the weight contributed by the probe is calculated based on distance data, a square of the distance data, and a location of the probe. Then, weighted averaging is performed on the illumination data of the probe based on the contributed weight, to obtain a shading result of the pixel.

For example, the probe data may include attribute data and environment data that are used in the rendering process.

Because a data amount of the probe data is large, the computing center server can compress the probe data, and send a corresponding bitstream to the client, to reduce bandwidth occupied by the server and client and a rendering delay of the client. Correspondingly, after receiving the bitstream, the client may decode the bitstream, to restore the probe data; and determine the shading effect of the object in the three-dimensional scene based on the probe data in the rendering process.

Figure 2A:
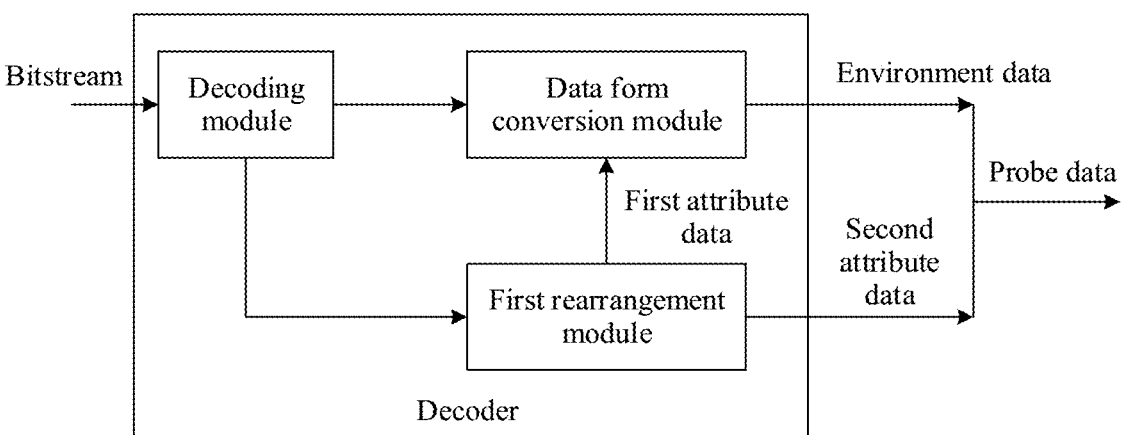
FIG. 2a is a diagram of an example of a decoding framework.

FIG. 2a is a diagram of an example of a decoding framework.

Refer to FIG. 2a. For example, a decoder may include a data form conversion module, a first rearrangement module, and a decoding module.

For example, the data form conversion module may be configured to perform data form conversion on a portion of data obtained by decoding the bitstream, to obtain environment data of the probe.

For example, the first rearrangement module may be configured to rearrange the portion of data obtained by decoding the bitstream, to obtain attribute data of the probe. The attribute data of the probe may include attribute data for data form conversion (which is referred to as first attribute data in the following) and the attribute data used in the rendering process (which is referred to as second attribute data in the following).

For example, the decoding module is configured to decode the bitstream.

It should be noted that operations performed by the data form conversion module and the first rearrangement module are operations in a decoding procedure of the decoder.

It should be understood that FIG. 2*a* is merely an example of the decoder in this application. The decoder in this application may have fewer modules than those in FIG. 2*a*. For example, the decoder includes the data form conversion module and the decoding module. This is not limited in this application. Alternatively, the decoder in this application may have more modules than those shown in FIG. 2*a*. This is not limited in this application.

It should be understood that the data form conversion module, the first rearrangement module, and the decoding module in FIG. 2*a* may be modules independent of each other, or any two or more of the modules are integrated as a whole. This is not limited in this application. In addition, the data form conversion module, the first rearrangement module, and the decoding module are logical modules, and the decoder may be further divided into other modules or the modules have other names. This is not limited in this application either.

It should be understood that, in a possible example, the decoder may include only the decoding module, the data form conversion module, and the first rearrangement module that may be independent of the decoder. This is not limited in this application. This application provides an example for description by using the decoder in FIG. 2*a* as an example.

Figure 2B:
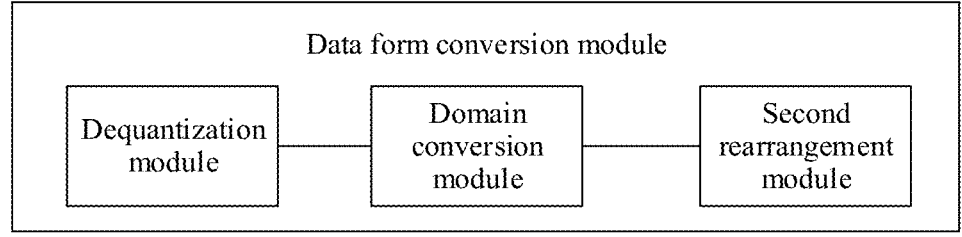
FIG. 2b is a diagram of an example of a structure of a data form conversion module.

FIG. 2*b* is a diagram of an example of a structure of a data form conversion module.

Refer to FIG. 2*b*. For example, the data form conversion module may include a dequantization module, a domain conversion module, and a second rearrangement module.

For example, the dequantization module may be for dequantization. It should be understood that the dequantization is an inverse process of quantization.

For example, the domain conversion module may be used for domain conversion. For example, the domain conversion may be converting a representation form of data from one domain to another domain. Domains may be classified from different perspectives based on requirements.

For example, from a perspective of whether normalization is performed, the domains may be classified into a normalized domain and a non-normalized domain.

From a perspective of a color space, the domains may be classified into an RGB domain, a YUV domain, an XYZ domain, a Lab domain, and the like.

From a perspective of a numerical relationship, the domains may be classified into a linear domain and a non-linear domain. The non-linear domain may be, for example, an exponential domain, a PQ (perceptual quantizer) domain, or an HLG (hybrid log-gamma) domain.

From a perspective of a numerical representation form, the domains may be classified into a picture domain and a transform domain. For example, the picture domain may be a domain represented by a picture. For example, the transform domain may be a domain indicated by a transform basis function and a corresponding transform coefficient. For data $Y(t)$ in the transform domain, x transform bases $e\_1(t)$ to $e\_x(t)$ may be used to approximate the data $Y(t)$, so that the data $Y(t)$ is approximately equal to a sum of the x transform bases multiplied by corresponding transform coefficients. The transform basis includes but is not limited to a spherical harmonics function basis, a spherical wavelet basis, an eigenvector, and the like. This is not limited in this application.

For example, the second rearrangement module may be configured to rearrange data.

It should be understood that FIG. 2*b* is merely an example of the data form conversion module in this application. The data form conversion module in this application may have fewer modules than those in FIG. 2*b*. For example, the data form conversion module includes only the dequantization module and the domain conversion module, or the data form conversion module includes only the domain conversion module and the second rearrangement module. This is not limited in this application. Alternatively, the data form conversion module in this application may have more modules than those in FIG. 2*b*. This is not limited in this application.

It should be understood that the dequantization module, the domain conversion module, and the second rearrangement module in FIG. 2*b* may be modules independent of each other, or any two or more of the modules are integrated as a whole. This is not limited in this application. In addition, the dequantization module, the domain conversion module, and the second rearrangement module are logical modules, and the data form conversion module may be further divided into other modules or the modules have other names. This is not limited in this application either.

The following describes a decoding process of the first device by using an example.

Figure 3A:
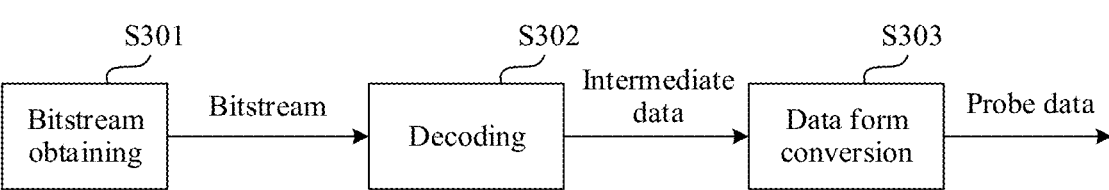
FIG. 3a is a diagram of an example of a decoding procedure.

FIG. 3*a* is a diagram of an example of a decoding procedure. The decoding procedure may include the following operations: S301: Obtain a bitstream. S302: Perform decoding. S303: Perform data form conversion.

S301: Obtain the bitstream, that is, bitstream obtaining, where the bitstream includes intermediate data encoded by a second device.

For example, in an N-end synergy rendering scene, the second device may generate probe data of K (K is a positive integer, and K is less than or equal to M) probes in a current frame based on the foregoing descriptions, and input the probe data of the K probes into an encoder. In this way, the encoder may obtain the probe data of the K probes. Then, the encoder may perform data form conversion on the probe data of the K probes, to obtain the intermediate data; encode the intermediate data, to obtain the corresponding bitstream; and send the bitstream to a first device. The encoder performs data form conversion on the probe data to convert the probe data into data in a more compact representation form, so that compression is easier. Therefore, in comparison with the conventional technology, a bit rate can be reduced while same rendering effect of the first device is ensured. Alternatively, the encoder performs data form conversion on the probe data, to increase a quantity of bits occupied by data of higher importance in a rendering process in the bitstream. Therefore, in comparison with the conventional technology, rendering effect of the first device can be better under a same bit rate.

For example, after the second device sends the bitstream obtained by encoding the intermediate data corresponding to the probe data, the first device may receive the bitstream, and input the bitstream to a decoder, so that the decoder may obtain the bitstream.

S302: Perform decoding, that is, decoding the bitstream obtained in S301, to obtain the intermediate data.

For example, after obtaining the bitstream, the decoder may decode the bitstream, to obtain the intermediate data corresponding to the K pieces of probe data.

For example, any video decoding scheme may be used to decode the intermediate data, to obtain the bitstream corresponding to the probe data. For example, HEVC (high efficiency video coding) decoding may be performed on the bitstream, to obtain the intermediate data. For another example, AVC (advanced video coding) decoding may be performed on the bitstream, to obtain the intermediate data. For another example, VVC (versatile video coding) decoding may be performed on the bitstream, to obtain the intermediate data. For another example, entropy decoding may be performed on the bitstream, to obtain the intermediate data. It should be understood that a decoding scheme of the bitstream is not limited in this application. For another example, the intermediate data may be encoded in another video decoding scheme like an AVS (audio video coding standard), to obtain the corresponding bitstream. This is not limited in this application.

S303: Perform data form conversion, that is, performing data form conversion on the intermediate data obtained in S302, to obtain the probe data.

For example, after obtaining the intermediate data, the decoder of the first device may perform data form conversion on the intermediate data, to restore the probe data from the intermediate data.

For example, the data form conversion may be conversion from one data form to another data form. It should be understood that the data form conversion of the decoder of the first device is an inverse process of the data form conversion of the encoder of the second device.

For example, the data form conversion may include domain conversion.

For example, the domain conversion may include at least one of the following: conversion from a normalized domain to a non-normalized domain, conversion from a non-linear domain to a linear domain, conversion from a YUV domain to an RGB domain, conversion from an XYZ domain to an RGB domain, and conversion from a Lab domain to an RGB domain. It should be understood that this application may further include another type of domain conversion. This is not limited in this application.

For example, conversion from a normalized domain to a non-normalized domain is inverse normalization. When the domain conversion is conversion from the normalized domain to the non-normalized domain, inverse normalization may be performed on the intermediate data based on a normalization parameter, to obtain the probe data of the K probes. The normalization parameter may correspond to a normalization parameter used by the encoder of the second device to normalize the probe data, and may be obtained by the decoder of the first device in advance, or may be obtained by decoding the bitstream. This is not limited in this application.

The second device normalizes the probe data, and converts the probe data into a more compact representation form for compression, to achieve a lower bit rate under same rendering effect as that in the conventional technology. In this case, the decoder of the first device can restore the probe data by performing inverse normalization on the intermediate data.

For example, the intermediate data obtained by decoding the bitstream is data in a non-linear domain.

For example, when the non-linear domain is an exponential domain, conversion from the exponential domain to a linear domain may be performed on the intermediate data based on an exponential conversion parameter, to obtain the probe data of the K probes. In this case, the probe data of the K probes belongs to the linear domain. The exponential conversion parameter may be obtained by the decoder of the first device in advance, or may be obtained by decoding the bitstream. This is not limited in this application.

For example, when the non-linear domain is a PQ domain, conversion from the PQ domain to the linear domain may be performed on the intermediate data based on a PQ conversion parameter, to obtain the probe data of the K probes. In this case, the probe data of the K probes belongs to the linear domain. The PQ conversion parameter may be obtained by the decoder of the first device in advance, or may be obtained by decoding the bitstream. This is not limited in this application.

For example, when the non-linear domain is an HLG domain, conversion from the HLG domain to the linear domain may be performed on the intermediate data based on an HLG conversion parameter, to obtain the probe data of the K probes. In this case, the probe data of the K probes belongs to the linear domain. The HLG conversion parameter may be obtained by the decoder of the first device in advance, or may be obtained by decoding the bitstream. This is not limited in this application.

The second device performs conversion from the linear domain to the non-linear domain on the probe data, to increase a quantity of bits occupied by data, for compression, of higher importance required in the rendering process in the bitstream, so as to achieve better rendering effect under a same bit rate as that in the conventional technology. In this case, the decoder of the first device can restore the probe data by performing conversion from the non-linear domain into the linear domain on the intermediate data.

For example, the intermediate data obtained by decoding the bitstream may be data represented by YUV.

In a possible manner, when the intermediate data obtained by decoding the bitstream is data represented by YUV 444, conversion from a YUV domain to an RGB domain may be performed on the intermediate data in a manner of conversion from a YUV 444 color space to an RGB color space, to obtain the probe data of the K probes. In this case, the probe data of the K probes is represented by RGB.

In a possible manner, when the intermediate data obtained by decoding the bitstream is represented by YUV 420, conversion from a YUV domain to an RGB domain may be performed on the intermediate data in a manner of conversion from a YUV 420 color space to an RGB color space, to obtain the probe data of the K probes. In this case, the probe data of the K probes is represented by RGB.

For example, the intermediate data obtained by decoding the bitstream may be data represented by XYZ. Conversion from an XYZ domain to an RGB domain may be performed on the intermediate data in a manner of conversion from an XYZ color space to an RGB color space, to obtain the probe data of the K probes. In this case, the probe data of the K probes is represented by RGB.

For example, the intermediate data obtained by decoding the bitstream may be data represented by Lab. Conversion from a Lab domain to an RGB domain may be performed on the intermediate data in a manner of conversion from a Lab color space to an RGB color space, to obtain the probe data of the K probes. In this case, the probe data of the K probes is represented by RGB.

The second device performs conversion from the RGB domain to the YUV domain on the probe data of the K probes, to remove a redundancy of the probe data of each probe, so as to achieve a lower bit rate under same rendering effect as that in the conventional technology; or performs conversion from the RGB domain to the XYZ domain/Lab domain on the probe data of the K probes, to make the data fit for perception of the human eyes, so as to achieve a lower bit rate under same rendering effect as that in the conventional technology. In this case, the decoder of the first device may restore the probe data by performing conversion from the YUV domain/XYZ domain/Lab domain to the RGB domain on the intermediate data.

It should be understood that two or more of the plurality of types of domain conversion may be used to convert a data form of the intermediate data. This is not limited in this application. When the two or more types of domain conversion are used to implement data form conversion of the intermediate data, an execution sequence and a quantity of execution times of various types of domain conversion are not limited in this application, provided that the execution sequence and the quantity of execution times correspond to those in a domain conversion process of a decoder of the second device.

For example, it is assumed that data form conversion of the intermediate data is implemented through inverse normalization and conversion from an exponential domain to a linear domain. In a possible manner, inverse normalization may be performed on the intermediate data, and then conversion from the exponential domain to the linear domain is performed on the intermediate data obtained through inverse normalization, to obtain the probe data. In a possible manner, conversion from the exponential domain to the linear domain may be performed on the intermediate data, and then inverse normalization is performed on the intermediate data in the linear domain, to obtain the probe data.

For another example, it is assumed that data form conversion of the intermediate data is implemented through inverse normalization, conversion from a YUV domain to an RGB domain, and conversion from an exponential domain to a linear domain. In a possible manner, inverse normalization may be performed on the intermediate data, conversion from the exponential domain to the linear domain is performed on the intermediate data obtained through inverse normalization, and then conversion from the YUV domain to the RGB domain is performed on the data in the linear domain, to obtain the probe data. In a possible manner, inverse normalization may be performed on the intermediate data, conversion from the YUV domain to the RGB domain is performed on the intermediate data obtained through inverse normalization, and then conversion from the exponential domain to the linear domain is performed on the data in the RGB domain, to obtain the probe data. In a possible manner, inverse normalization may be performed on the intermediate data based on the normalization parameter for the first time, inverse normalization may be performed, based on another normalization parameter for the second time, on the intermediate data obtained through inverse normalization, conversion from the YUV domain to the RGB domain is performed on intermediate data obtained through two times of inverse normalization, and then conversion from the exponential domain to the linear domain is performed on the data in the RGB domain, to obtain the probe data.

It should be noted that operations in S303 are operations in a decoding procedure.

For example, when the bitstream includes intermediate data corresponding to illumination data encoded by the second device, the decoder of the first device obtains the illumination data through decoding. When the bitstream includes intermediate data corresponding to visibility data encoded by the second device, the decoder of the first device obtains the visibility data through decoding. When the bitstream includes intermediate data corresponding to the illumination data encoded by the second device and intermediate data corresponding to the visibility data, the decoder of the first device obtains the illumination data and the visibility data through decoding. In other words, in an embodiment in FIG. 3a, the probe data obtained by the decoder of the first device through decoding may include the illumination data and/or the visibility data.

The second device performs data form conversion on the probe data, to achieve a lower bit rate under same rendering effect or better rendering effect under a same bit rate in comparison with the conventional technology. Therefore, the probe data is converted into a more compact representation form for compression, or a quantity of bits occupied by data of higher importance is increased in the bitstream in the rendering process for compression. In this case, the decoder of the first device can restore the probe data from the intermediate data through data form conversion, to subsequently determine shading effect of an object in a three-dimensional scene in a rendering process based on the probe data.

Figure 3B:
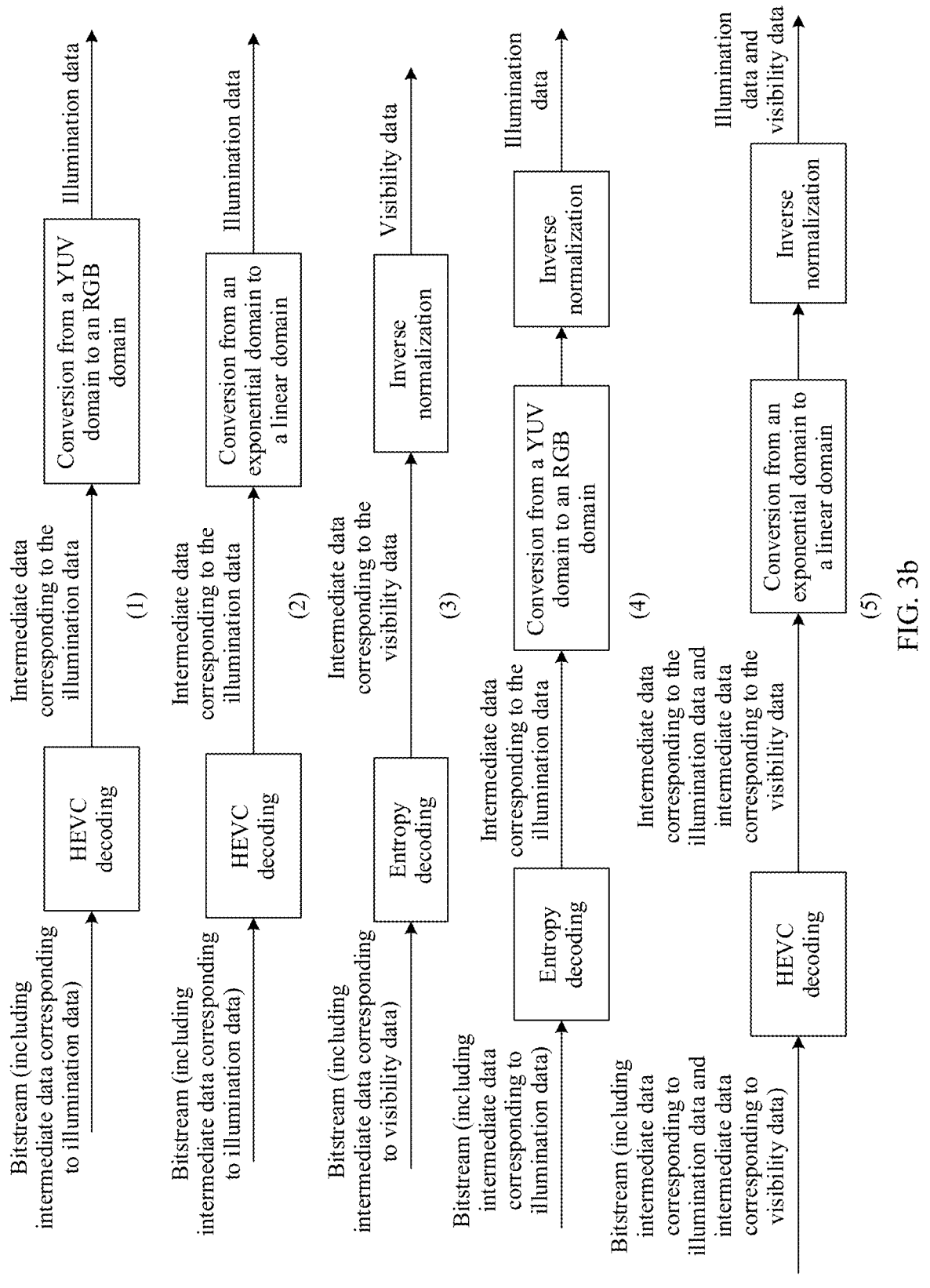
FIG. 3b is a diagram of an example of a decoding procedure.

FIG. 3b is a diagram of an example of a decoding procedure.

Refer to FIG. 3b(1). For example, the obtained bitstream includes the intermediate data corresponding to the illumination data. First, HEVC decoding (or other decoding) may be performed on the bitstream, to obtain the intermediate data corresponding to the illumination data. Then, conversion from the YUV domain to the RGB domain is performed on the intermediate data corresponding to the illumination data, to obtain the illumination data.

Refer to FIG. 3b(2). For example, the obtained bitstream includes the intermediate data corresponding to the illumination data. First, HEVC decoding (or other decoding) may be performed on the bitstream, to obtain the intermediate data corresponding to the illumination data. Then, conversion from the exponential domain to the linear domain is performed on the intermediate data corresponding to the illumination data, to obtain the illumination data.

Refer to FIG. 3b(3). For example, the obtained bitstream includes the intermediate data corresponding to the visibility data. First, entropy decoding (or other decoding) may be performed on the bitstream, to obtain the intermediate data corresponding to the visibility data. Then, inverse normalization is performed on the intermediate data corresponding to the visibility data, to obtain the visibility data.

Refer to FIG. 3b(4). For example, the obtained bitstream includes the intermediate data corresponding to the illumination data. First, entropy decoding (or other decoding) may be performed on the bitstream, to obtain the intermediate data corresponding to the illumination data. Then, conversion from the YUV domain to the RGB domain and inverse normalization are performed on the intermediate data corresponding to the illumination data, to obtain the illumination data.

Refer to FIG. 3b(5). For example, the obtained bitstream includes the intermediate data corresponding to the illumination data and the intermediate data corresponding to the visibility data. First, HEVC decoding (or other decoding) may be performed on the bitstream, to obtain the intermediate data corresponding to the illumination data and the intermediate data corresponding to the visibility data. Then, conversion from the exponential domain to the linear domain and inverse normalization are performed on the intermediate data corresponding to the illumination data and the intermediate data corresponding to the visibility data, to obtain the illumination data and the visibility data.

For example, the data form conversion may further include dequantization and/or rearrangement. In this way, data form conversion may be performed on the probe data in a manner of combining domain conversion and dequantization, or a manner of combining domain conversion and rearrangement, or a manner of combining domain conversion, dequantization, and rearrangement. The second device performs data form conversion on the probe data in a manner of combining domain conversion and quantization and/or rearrangement, to further reduce the bitstream. In this case, the decoder of the first device may also restore the probe data from the intermediate data.

It should be understood that when the decoder of the first device uses the manner of combining domain conversion and dequantization and/or rearrangement, an execution sequence of domain conversion, dequantization, and rearrangement is not limited, and a quantity of times of performing any one of domain conversion, dequantization, and rearrangement is not limited in this application either, provided that when an encoder of the second device uses the manner of combining domain conversion and quantization and/or rearrangement, an execution sequence and quantities of times of domain conversion, quantization, and rearrangement of the second device correspond to the execution sequence and the quantities of times of domain conversion, dequantization, and rearrangement of the first device.

For example, dequantization may be performed based on a quantization parameter. The quantization parameter may correspond to a quantization parameter used by the encoder of the second device to quantize the probe data.

For example, the rearrangement may include first manner rearrangement and/or second manner rearrangement.

For example, the first manner rearrangement may include at least one of the following: when the intermediate data is the intermediate data corresponding to the illumination data, the first manner rearrangement includes at least one of the following: adding a channel to the intermediate data corresponding to the illumination data, converting the intermediate data corresponding to the illumination data into a data storage format of the first device, or performing dimension conversion on the intermediate data corresponding to the illumination data.

It should be noted that "the intermediate data corresponding to the illumination data" in "converting the intermediate data corresponding to the illumination data into a data storage format of the first device" may be original intermediate data, in the bitstream, corresponding to the illumination data, or intermediate data corresponding to the illumination data obtained through domain conversion, or intermediate data corresponding to dequantized illumination data, or intermediate data corresponding to the illumination data to which a channel is added, or intermediate data corresponding to the illumination data obtained through dimension conversion.

It should be noted that "the intermediate data corresponding to the illumination data" in "performing dimension conversion on the intermediate data corresponding to the illumination data" may be original intermediate data, in the bitstream, corresponding to the illumination data, or intermediate data corresponding to the illumination data obtained through domain conversion, or intermediate data corresponding to dequantized illumination data, or intermediate data corresponding to the illumination data to which a channel is added, or intermediate data corresponding to the illumination data whose data format is converted into the data storage format of the first device.

For example, when the intermediate data is the intermediate data corresponding to the visibility data, and the intermediate data corresponding to the visibility data includes a plurality of channels, the first manner rearrangement includes at least one of the following: combining the channels, converting the intermediate data corresponding to the visibility data into a data storage format of the first device, or performing dimension conversion on the intermediate data corresponding to the visibility data.

It should be noted that "the intermediate data corresponding to the visibility data" in "converting the intermediate data corresponding to the visibility data into a data storage format of the first device" may be original intermediate data, in the bitstream, corresponding to the visibility data, or intermediate data corresponding to the visibility data obtained through domain conversion, or intermediate data corresponding to dequantized visibility data, or intermediate data corresponding to the visibility data to which a channel is added, or intermediate data corresponding to the visibility data obtained through dimension conversion.

It should be noted that "the intermediate data corresponding to the visibility data" in "performing dimension conversion on the intermediate data corresponding to the visibility data" may be original intermediate data, in the bitstream, corresponding to the visibility data, or intermediate data corresponding to the visibility data obtained through domain conversion, or intermediate data corresponding to dequantized visibility data, or intermediate data corresponding to the visibility data to which a channel is added, or intermediate data corresponding to the visibility data whose data format is converted into the data storage format of the first device.

For example, the intermediate data may be data on a YUV plane, and the second manner rearrangement may be used to extract data from the YUV plane, and arrange the data extracted from the YUV plane into a two-dimensional picture.

It should be noted that, when the intermediate data is not data on the YUV plane, the operation of performing second manner rearrangement on the intermediate data may not be performed.

It should be noted that, when the data extracted from the YUV plane is the transform basis and the transform coefficient, the second manner rearrangement may not include arranging the data extracted from the YUV plane into a two-dimensional picture.

The following describes a plurality of manners of combining domain conversion and dequantization and/or rearrangement.

Figure 4A:
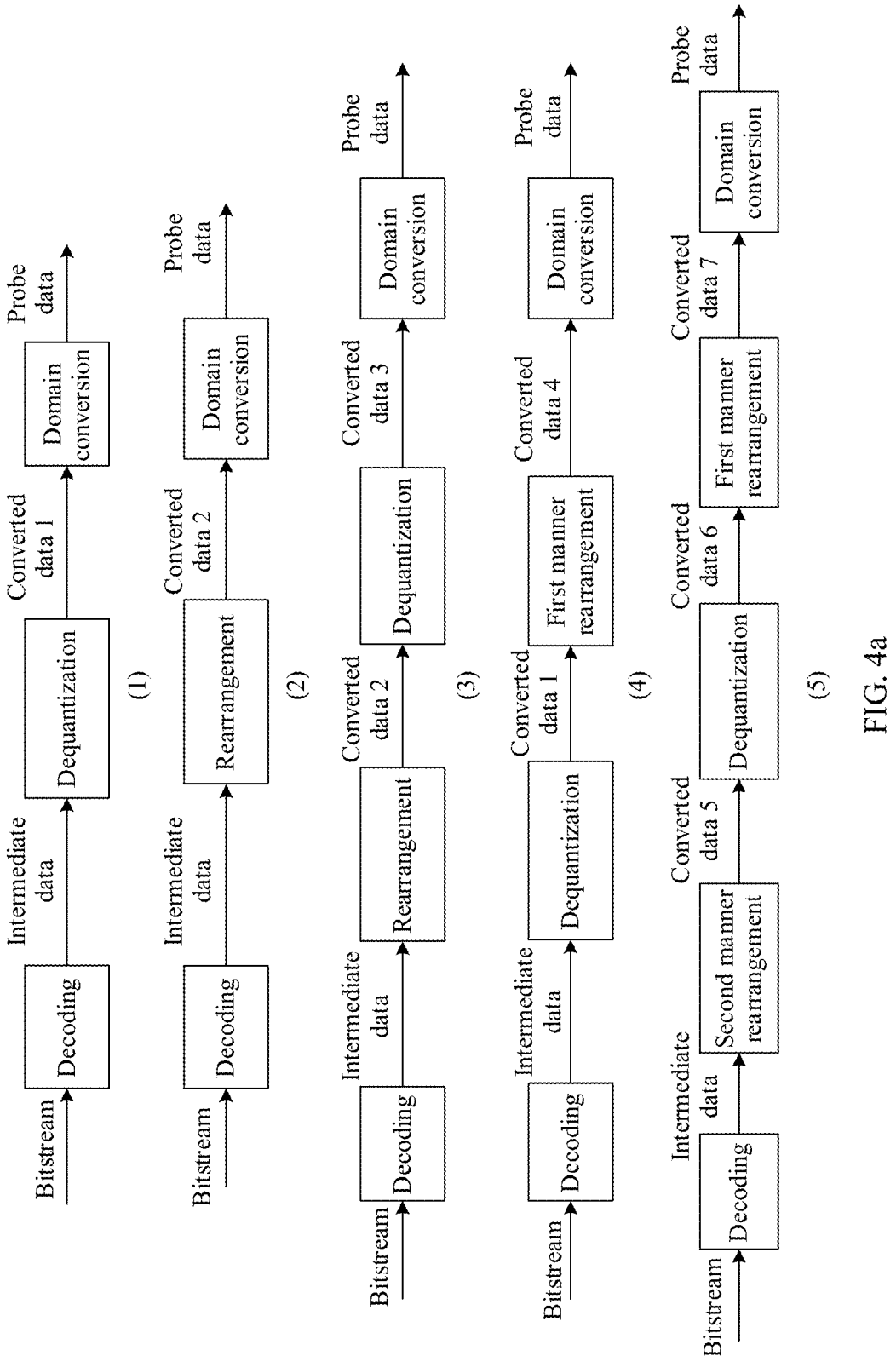
FIG. 4a is a diagram of an example of a decoding procedure.

FIG. 4a is a diagram of an example of a decoding procedure.

In an embodiment in FIG. 4a(1), a manner of combining domain conversion and dequantization is described. Refer to FIG. 4a(1). For example, after the bitstream is obtained, the bitstream may be decoded, to obtain the intermediate data. Then, the intermediate data is dequantized, to obtain converted data 1; and domain conversion is performed on the converted data 1, to obtain the probe data.

In an embodiment in FIG. 4a(2), a manner of combining domain conversion and rearrangement is described. Refer to FIG. 4a(2). For example, after the bitstream is obtained, the bitstream may be decoded, to obtain the intermediate data. Then, rearrangement is performed on the intermediate data, to obtain converted data 2; and domain conversion is performed on the converted data 2, to obtain the probe data. The rearrangement in FIG. 4a(2) may include first manner rearrangement and/or second manner rearrangement.

In an embodiment in FIG. 4a(3), a manner of combining domain conversion, dequantization, and rearrangement is described. Refer to FIG. 4a(3). For example, after the bitstream is obtained, the bitstream may be decoded, to obtain the intermediate data. Then, rearrangement is performed on the intermediate data, to obtain converted data 2; the converted data 2 is dequantized, to obtain converted data 3; and domain conversion is performed on the converted data 3, to obtain the probe data.

In an embodiment in FIG. 4a(4), a manner of combining domain conversion, dequantization, and first manner rearrangement is described. Refer to FIG. 4a(4). For example, after the bitstream is obtained, the bitstream may be decoded, to obtain the intermediate data. Then, the intermediate data is dequantized, to obtain converted data 1; first manner rearrangement is performed on the converted data 1, to obtain converted data 4; and domain conversion is performed on the converted data 4, to obtain the probe data.

In an embodiment in FIG. 4a(5), another manner of combining domain conversion, dequantization, and rearrangement is described. Refer to FIG. 4a(5). For example, after the bitstream is obtained, the bitstream may be decoded, to obtain the intermediate data. Then, second manner rearrangement is performed on the intermediate data, to obtain converted data 5; the converted data 5 is dequantized, to obtain converted data 6; first manner rearrangement is performed on the converted data 6, to obtain converted data 7; and domain conversion is performed on the converted data 7, to obtain the probe data.

Figure 4B:
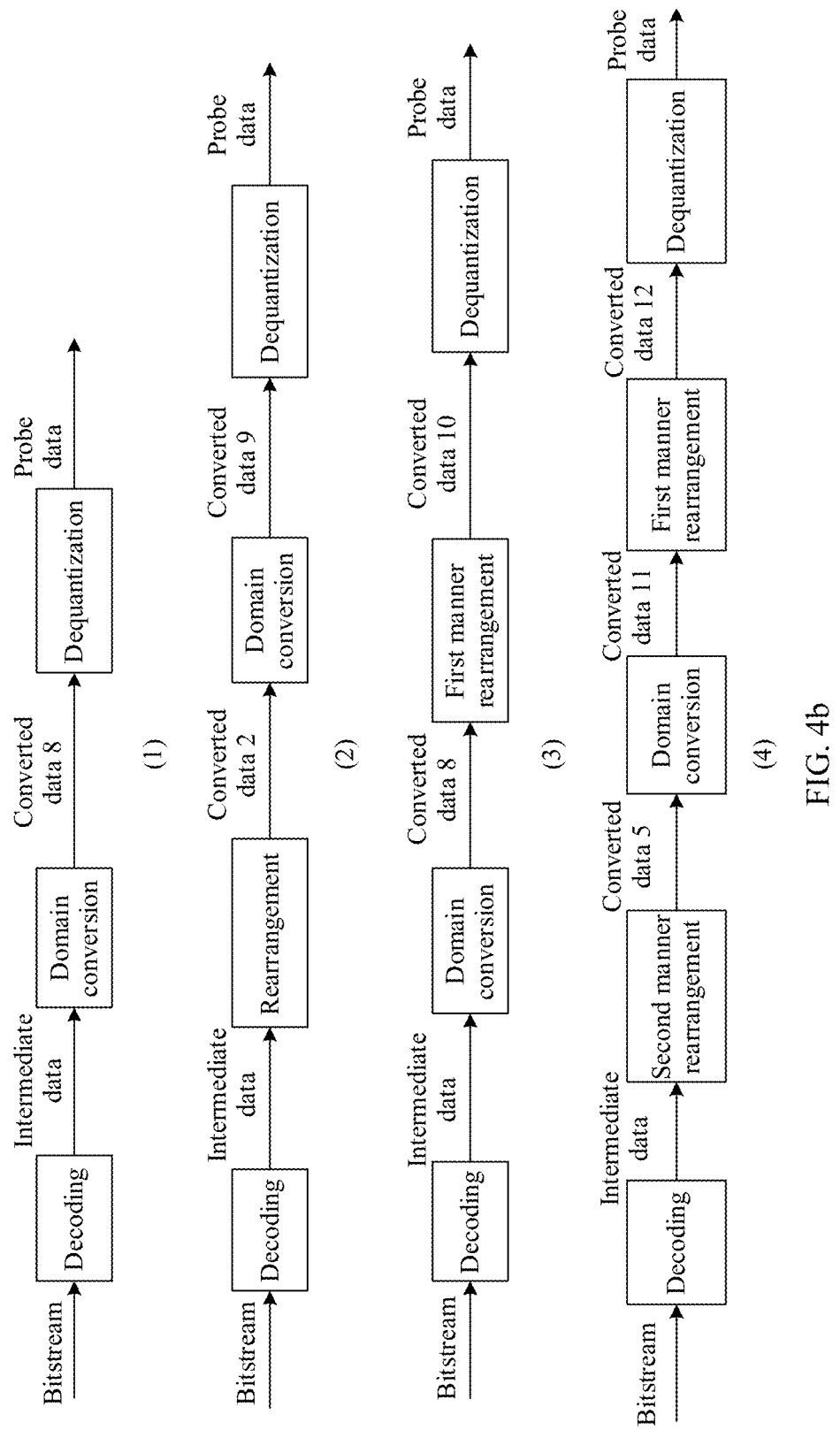
FIG. 4b is a diagram of an example of a decoding procedure.

FIG. 4b is a diagram of an example of a decoding procedure.

In an embodiment in FIG. 4b(1), a manner of combining domain conversion and dequantization is described. Refer to FIG. 4b(1). For example, after the bitstream is obtained, the bitstream may be decoded, to obtain the intermediate data. Then, domain conversion is performed on the intermediate data, to obtain converted data 8; and the converted data 8 is dequantized, to obtain the probe data.

In an embodiment in FIG. 4b(2), a manner of combining domain conversion, dequantization, and rearrangement is described. Refer to FIG. 4b(2). For example, after the bitstream is obtained, the bitstream may be decoded, to obtain the intermediate data. Then, rearrangement is performed on the intermediate data, to obtain the converted data 2; domain conversion is performed on the converted data 2, to obtain converted data 9; and the converted data 9 is dequantized, to obtain the probe data. The rearrangement in FIG. 4b(2) may include first manner rearrangement and/or second manner rearrangement.

In an embodiment in FIG. 4b(3), a manner of combining domain conversion, dequantization, and rearrangement is described. Refer to FIG. 4b(3). For example, after the bitstream is obtained, the bitstream may be decoded, to obtain the intermediate data. Then, domain conversion is performed on the intermediate data, to obtain the converted data 8; first manner rearrangement is performed on the converted data 8, to obtain converted data 10; and the converted data 10 is dequantized, to obtain the probe data.

In an embodiment in FIG. 4b(4), a manner of combining domain conversion, dequantization, and rearrangement is described. Refer to FIG. 4b(4). For example, after the bitstream is obtained, the bitstream may be decoded, to obtain the intermediate data. Then, second manner rearrangement is performed on the intermediate data, to obtain the converted data 5; domain conversion is performed on the converted data 5, to obtain converted data 11; first manner rearrangement is performed on the converted data 11, to obtain converted data 12; and the converted data 12 is dequantized, to obtain the probe data.

FIG. 4c(1) to FIG. 4c(6) are a diagram of an example of a decoding procedure.

In an embodiment in FIG. 4c(1), a manner of combining domain conversion and rearrangement is described. Refer to FIG. 4c(1). For example, after the bitstream is obtained, the bitstream may be decoded, to obtain the intermediate data. Then, domain conversion is performed on the intermediate data, to obtain the converted data 8; and first manner rearrangement is performed on the converted data 8, to obtain the probe data.

In an embodiment in FIG. 4c(2), a manner of combining domain conversion, rearrangement, and dequantization is described. Refer to FIG. 4c(2). For example, after the bitstream is obtained, the bitstream may be decoded, to obtain the intermediate data. Then, the intermediate data is dequantized, to obtain the converted data 1; domain conversion is performed on the converted data 1, to obtain converted data 13; and first manner rearrangement is performed on the converted data 13, to obtain the probe data.

In an embodiment in FIG. 4c(3), a manner of combining domain conversion, rearrangement, and dequantization is described. Refer to FIG. 4c(3). For example, after the bitstream is obtained, the bitstream may be decoded, to obtain the intermediate data. Then, domain conversion is performed on the intermediate data, to obtain the converted data 8; the converted data 8 is dequantized, to obtain converted data 14; and first manner rearrangement is performed on the converted data 14, to obtain the probe data.

In an embodiment in FIG. 4c(4), a manner of combining domain conversion and rearrangement is described. Refer to FIG. 4c(4). For example, after the bitstream is obtained, the bitstream may be decoded, to obtain the intermediate data. Then, second manner rearrangement is performed on the intermediate data, to obtain the converted data 5; domain conversion is performed on the converted data 5, to obtain the converted data 11; and first manner rearrangement is performed on the converted data 11, to obtain the probe data.

In an embodiment in FIG. 4c(5), a manner of combining domain conversion, rearrangement, and dequantization is described. Refer to FIG. 4c(5). For example, after the bitstream is obtained, the bitstream may be decoded, to obtain the intermediate data. Then, second manner rearrangement is performed on the intermediate data, to obtain the converted data 5; the converted data 5 is dequantized, to obtain the converted data 6; domain conversion is performed on the converted data 6, to obtain converted data 15; and first manner rearrangement is performed on the converted data 15, to obtain the probe data.

In an embodiment in FIG. 4c(6), a manner of combining domain conversion, rearrangement, and dequantization is described. Refer to FIG. 4c(6). For example, after the bitstream is obtained, the bitstream may be decoded, to obtain the intermediate data. Then, second manner rearrangement is performed on the intermediate data, to obtain the converted data 5; domain conversion is performed on the converted data 5, to obtain the converted data 11; the converted data 11 is dequantized, to obtain converted data 16; and first manner rearrangement is performed on the converted data 16, to obtain the probe data.

It should be noted that the domain conversion in FIG. 4a(1) to FIG. 4a(5), FIG. 4b(1) to FIG. 4b(4), and FIG. 4c(1) to FIG. 4c(6) may include at least one of the following: inverse normalization, conversion from a non-linear domain to a linear domain, conversion from a YUV domain to an RGB domain, conversion from an XYZ domain to an RGB domain, and conversion from a Lab domain to an RGB domain. It should be understood that this application may further include another type of domain conversion. This is not limited in this application. In addition, this application does not limit quantities of times of performing various types of domain conversion and an execution sequence of different types of domain conversion in FIG. 4a(1) to FIG. 4a(5), FIG. 4b(1) to FIG. 4b(4), and FIG. 4c(1) to FIG. 4c(6).

It should be noted that this application does not limit quantities of times of performing dequantization and an execution sequence in FIG. 4a(1) to FIG. 4a(5), FIG. 4b(1) to FIG. 4b(4), and FIG. 4c(1) to FIG. 4c(6).

It should be noted that the first manner rearrangement in FIG. 4a(1) to FIG. 4a(5), FIG. 4b(1) to FIG. 4b(4), and FIG. 4c(1) to FIG. 4c(6) may include at least one of the following: adding a channel, combining channels, converting data into a data storage format of the first device, and dimension conversion. In addition, this application does not limit quantities of times of performing various types of first manner rearrangement and an execution sequence of different types of first manner rearrangement in FIG. 4a(1) to FIG. 4a(5), FIG. 4b(1) to FIG. 4b(4), and FIG. 4c(1) to FIG. 4c(6).

It should be understood that the decoding procedure in FIG. 3b and FIG. 4a to FIG. 4c(1) to FIG. 4c(6) corresponds to the encoding procedure of the encoder of the second device.

In a possible manner, after obtaining the bitstream, the decoder of the first device may decode the bitstream, to obtain bitstream structure information and attribute data. For example, the bitstream structure information may include but is not limited to: a quantity of probes, a location, a length, and a data format of the intermediate data corresponding to the illumination data, an execution sequence of data form conversion types corresponding to the illumination data, a location, a length, and a data format of the intermediate data corresponding to the visibility data, an execution sequence of data form conversion types corresponding to the visibility data, a location, a length, and a data format of first attribute data, and a location, a length, and a data format of second attribute data. This is not limited in this application. The data form conversion types may include various data form conversion types used by the second device during encoding, for example, various first manner rearrangement types (for example, discarding data of some channels, channel splitting, precision conversion, and dimension conversion) corresponding to, various normalization types (for example, maximum value normalization, fixed parameter normalization, min-max normalization, and z-score normalization), various domain conversion types (for example, conversion from a linear domain to a non-linear domain, conversion from an RGB domain to a YUV domain, conversion from an RGB domain to an XYZ domain, conversion from an RGB domain to a Lab domain, and conversion from a picture domain to a transform domain), and various quantization types (for example, uniform quantization and non-uniform quantization). The second manner rearrangement type includes a second rearrangement type, for example, padding to the YUV plane, used by the second device during encoding. This is not limited in this application. The first attribute data may include the quantization parameter, a domain conversion parameter, and a rearrangement parameter. The domain conversion parameter may include a normalization parameter, an exponential conversion parameter, a PQ conversion parameter, an HLG conversion parameter, and a color space conversion parameter. This is not limited in this application.

In this way, the decoder of the first device may perform corresponding data form conversion, based on the bitstream structure information and the first attribute data that are obtained through decoding, on the intermediate data, to restore the probe data from the intermediate data.

It should be understood that the bitstream structure information may include more or less information than the foregoing information. This is not limited in this application.

FIG. 4d is a diagram of an example of a structure of a bitstream. The bitstream shown in FIG. 4d includes the intermediate data corresponding to the visibility data, the intermediate data corresponding to the illumination data, the attribute data, and the bitstream structure information.

It should be understood that the bitstream structure information may include more or less information than the foregoing information shown in FIG. 4d. This is not limited in this application.

In a possible manner, the decoder of the first device may obtain, in advance, information related to a data conversion form in the encoding process of the encoder of the second device, where the information includes but is not limited to an execution sequence of data form conversion types corresponding to the illumination data, an execution sequence of data form conversion types corresponding to the visibility data, the first attribute data, and the like. This is not limited in this application. In this case, the bitstream may not include the bitstream structure information and the attribute data.

In this way, after obtaining the intermediate data, the decoder of the first device may perform corresponding data form conversion, based on the information that is obtained in advance and that is related to the data conversion form in the encoding process, on the intermediate data, to restore the probe data from the intermediate data.

The following uses the decoding procedure shown in FIG. 4c(5) as an example to describe in detail a process of obtaining the illumination data through decoding.

Figure 5:
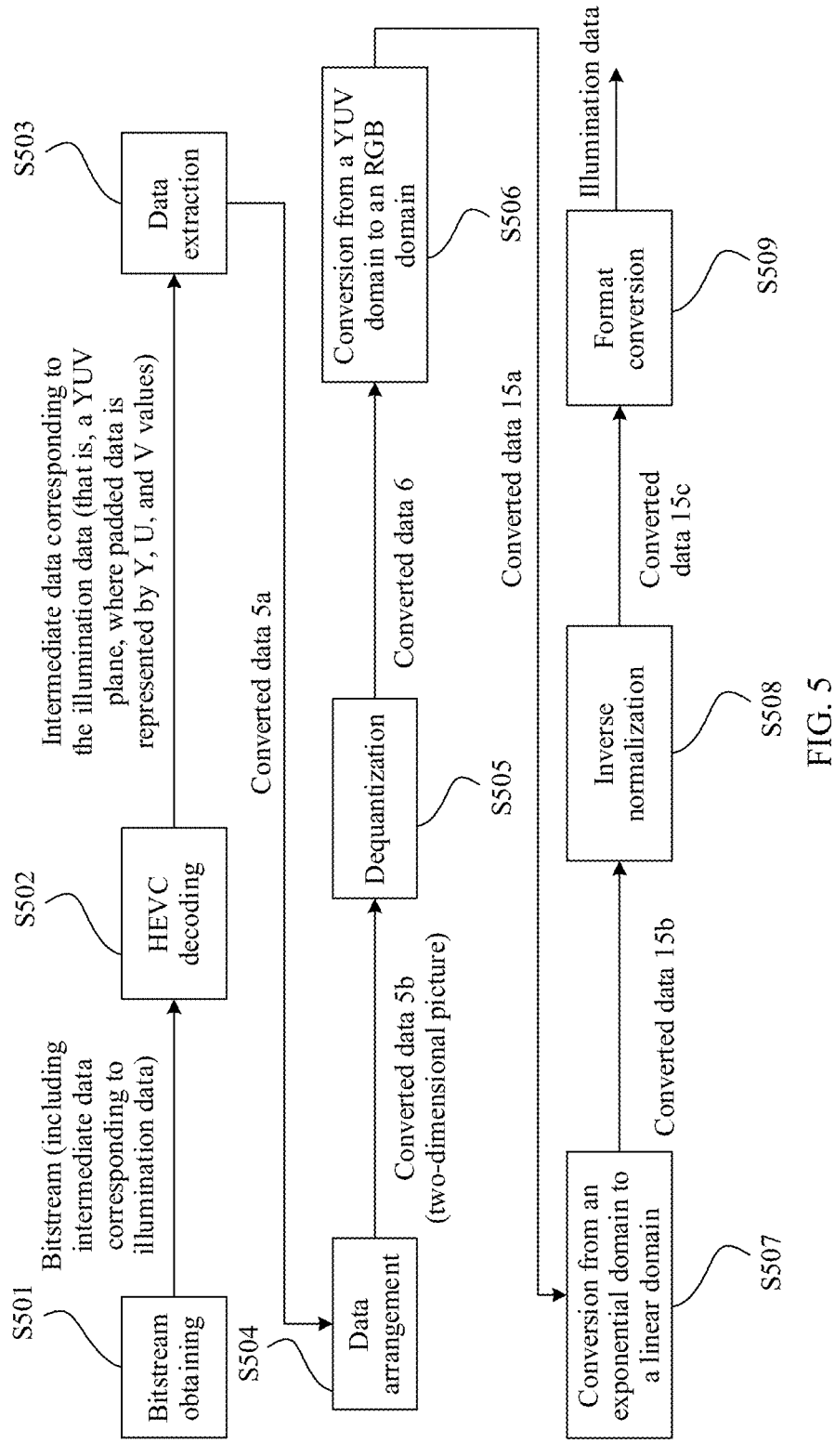
FIG. 5 is a diagram of an example of a decoding procedure.

FIG. 5 is a diagram of an example of a decoding procedure. The decoding procedure may include the following operations: S501: Obtain a bitstream. S502: Perform HEVC decoding. S503: Perform data extraction. S504: Perform data arrangement. S505: Perform dequantization. S506: Perform conversion from a YUV domain to an RGB domain. S507: Perform conversion from an exponential domain to a linear domain. S508: Perform inverse normalization. S509: Perform format conversion. In an embodiment in FIG. 5, intermediate data is data represented by Y, U, and V values. The converted data 5 includes converted data 5a and converted data 5b; and the converted data 15 includes converted data 15a, converted data 15b, and converted data 15c.

S501: Obtain the bitstream, that is, bitstream obtaining, where the bitstream includes intermediate data corresponding to illumination data encoded by a second device.

For example, the intermediate data included in the bitstream corresponds to illumination data of K probes.

S502: Perform HEVC decoding, that is, performing HEVC decoding on the bitstream obtained in S501, to obtain the intermediate data corresponding to the illumination data, where the intermediate data is data on a YUV plane, and data padded to the YUV plane is represented by Y, U, and V values.

For example, HEVC decoding may be performed on the bitstream, to obtain, from the bitstream through decoding, the intermediate data corresponding to the illumination data of K probes.

For example, whether the intermediate data is data on the YUV plane may be determined based on a rearrangement parameter. In the embodiment in FIG. 5, the intermediate data is data on the YUV plane.

For example, a type of the YUV plane may be determined based on the rearrangement parameter. For example, the YUV plane may be a YUV 444 plane, a YUV 420 plane, or another type of YUV plane. This is not limited in this application.

For example, precision of the data on the YUV plane may be determined based on the rearrangement parameter. For example, the precision of the data on the YUV plane may be 16 bits or 12 bits. This is not limited in this application either.

For example, precision of valid data in the data padded to the YUV plane may be determined based on the rearrangement parameter. For example, the precision of valid data in the data padded to the YUV plane is less than or equal to the precision of the data on the YUV plane. For example, the precision of the data on the YUV plane is 16 bits, and the precision of valid data in the data padded to the YUV plane may be 12 bits (0 s are padded to the other four bits). For another example, the precision of the data on the YUV plane is 12 bits, and the precision of valid data in the data padded to the YUV plane may be 12 bits.

For example, a representation form of the data padded to the YUV plane may be determined based on the rearrangement parameter. In the embodiment in FIG. 5, the data padded to the YUV plane may be data of three channels of Y, U, and V, where data of each of the three channels of Y, U, and V is represented by Y, U, and V values.

S503: Perform data extraction, that is, extracting data from the YUV plane obtained in S502, to obtain the converted data 5a.

For example, the YUV plane may include a Y plane, a U plane, and a V plane. When the YUV plane is the YUV 420 plane, Y plane:U plane:V plane=4:1:1. When the YUV plane is the YUV 444 plane, Y plane:U plane:V plane=1:1:1.

For example, the data of the Y channel is padded to the Y plane. In this way, the data of the Y channel may be extracted from the Y plane. For example, the data of the U channel is padded to the U plane. In this way, the data of the U channel may be extracted from the U plane. For example, the data of the V channel is padded to the V plane. In this way, the data of the V channel may be extracted from the V plane. It should be noted that when the data is extracted from the YUV plane, an invalid precision bit of the data may be discarded.

In this way, the data of the three channels of Y, U, and V may be extracted from the YUV plane, and the data of the three channels of Y, U, and V is referred to as the converted data 5a.

S504: Perform data arrangement, that is, arranging the converted data 5a obtained in S503 into a two-dimensional picture, to obtain the converted data 5b.

For example, the converted data 5a may be arranged into the two-dimensional picture, where each pixel of the two-dimensional picture includes three channels of Y, U, and V, and data of each channel is represented by Y, U, and V values. Each probe corresponds to a plurality of pixels in the two-dimensional picture, and intermediate data corresponding to illumination data of each probe includes a plurality of pixels.

For example, the two-dimensional picture obtained by arranging the converted data 5a may be referred to as the converted data 5b. In other words, the converted data 5b is a two-dimensional picture in which a single pixel includes three channels of Y, U, and V, and data of each channel is represented by Y, U, and V values.

When the YUV plane is the YUV 444 plane, the three channels of Y, U, and V in the converted data 5b are represented by YUV 444, that is, each pixel in the converted data 5b corresponds to one Y channel, one U channel, and one V channel. When the YUV plane is the YUV 420 plane, the three channels of Y, U, and V in the converted data 5b are represented by YUV 420, each pixel in the converted data 5b corresponds to one Y channel, and every four pixels correspond to one U channel and one V channel.

It should be understood that in S503, the data padded to the YUV plane may be data of three channels of X, Y, and Z, where data of each of the three channels of X, Y, and Z is represented by X, Y, and Z values. In this way, the obtained converted data 5b is a two-dimensional picture in which a single pixel includes three channels of X, Y, and Z. In addition, in S503, the data padded to the YUV plane may further be data of three channels of L, a, and b, where data of each of the three channels of L, a, and b is represented by L, a, and b values. In this way, the obtained converted data 5b is a two-dimensional picture in which a single pixel includes three channels of L, a, and b. This is not limited in this application. This application provides descriptions by using an example in which the converted data 5b is a two-dimensional picture in which a single pixel includes three channels of Y, U, and V.

S505: Perform dequantization, that is, dequantizing the converted data 5b obtained in S504, to obtain the converted data 6.

For example, after the converted data 5b is obtained, the converted data 5b may be dequantized based on a quantization parameter, to obtain the converted data 6.

For example, for a pixel in the converted data 5b, data of a Y channel, data of a U channel, and data of a V channel of the pixel are separately dequantized based on the quantization parameter. In this way, data of each of three channels of Y, U, and V of each pixel in the converted data 5b may be dequantized, to obtain the converted data 6. For example, after being dequantized, data of each channel of each pixel in the converted data 5b may be converted into a range of [0, 1].

For example, the converted data 6 is a two-dimensional picture in which a single pixel includes three channels of Y, U, and V, where data of each of the three channels of Y, U, and V of each pixel in the two-dimensional picture is dequantized data.

When the YUV plane is the YUV 444 plane, the three channels of Y, U, and V in the converted data 6 are represented by YUV 444. When the YUV plane is the YUV 420 plane, the three channels of Y, U, and V in the converted data 6 are represented by YUV 420.

S506: Perform conversion from a YUV domain to an RGB domain, that is, performing conversion from the YUV domain to the RGB domain on the converted data 6 obtained in S505, to obtain the converted data 15a.

For example, a color space conversion parameter may be a color space format.

For example, when it is determined, based on the color space format, that the three channels of Y, U, and V in the converted data 6 are represented by YUV 444, the data of the three channels of Y, U, and V of each pixel in the converted data 6 is converted into data of three channels of R, G, and B in a manner of conversion from a YUV 444 color space to an RGB color space, to obtain the converted data 15a.

For example, when it is determined, based on the color space format, that the three channels of Y, U, and V in the converted data 6 are represented by YUV 420, the data of the three channels of Y, U, and V of each pixel in the converted data 6 is converted into data of three channels of R, G, and B in a manner of conversion from a YUV 420 color space to an RGB color space, to obtain the converted data 15a.

In this way, the obtained converted data 15a is a two-dimensional picture in which a single pixel includes three channels of R, G, and B, where data of each channel in the two-dimensional picture is dequantized data.

It should be understood that, when it is determined, based on the color space format, that the converted data 6 is a two-dimensional picture in which a single pixel includes three channels of X, Y, and Z, conversion from the YUV domain to the RGB domain in S506 may be replaced with conversion from an XYZ domain to the RGB domain. Alternatively, when it is determined, based on the color space format, that the converted data 6 is a two-dimensional picture in which a single pixel includes three channels of L, a, and b, conversion from the YUV domain to the RGB domain in S506 may be replaced with conversion from a Lab domain to the RGB domain. This is not limited in this application.

S507: Perform conversion from an exponential domain to a linear domain, that is, performing conversion from the exponential domain to the linear domain on the converted data 15a obtained in S506, to obtain the converted data 15b.

For example, when a domain conversion parameter includes an exponential conversion parameter, it may be determined that the converted data 15a belongs to the exponential domain. In this case, conversion from the exponential domain to the linear domain may be performed on the converted data 15a based on the exponential conversion parameter, to obtain the converted data 15b.

For example, for a pixel in the converted data 15a, extraction of an $n^{th}$ (n is the exponential conversion parameter) root is separately performed on data of each of the three channels of R, G, and B of the pixel, to perform conversion from the exponential domain to the linear domain on the data of each of the three channels of R, G, and B of the pixel. In this manner, conversion from the exponential domain to the linear domain may be performed on data of each of three channels of R, G, and B of each pixel in the two-dimensional picture. In other words, the converted data 15b is a two-dimensional picture in which a single pixel includes three channels of R, G, and B, where data of each of the three channels of R, G, and B of each pixel belongs to the linear domain.

It should be understood that when the domain conversion parameter includes a PQ conversion parameter, it may be determined that the converted data 15a belongs to a PQ domain. In this case, S506 may be replaced with performing conversion from the PQ domain to the linear domain on the converted data 15a, to obtain the converted data 15b. For example, the PQ conversion parameter may be a parameter of a PQ curve. For a pixel in the converted data 15a, inverse mapping is separately performed on data of each of the three channels of R, G, and B of the pixel via the PQ curve, to perform conversion from the PQ domain to the linear domain on the data of each of the three channels of R, G, and B of the pixel. In this manner, conversion from the PQ domain to the linear domain may be performed on data of each of three channels of R, G, and B of each pixel in the two-dimensional picture. In this case, the converted data 15b is a two-dimensional picture in which a single pixel includes three channels of R, G, and B, where data of each of the three channels of R, G, and B of each pixel belongs to the linear domain.

It should be understood that when the domain conversion parameter includes an HLG conversion parameter, it may be determined that the converted data 15a belongs to an HLG domain. In this case, S506 may be replaced with performing conversion from the HLG domain to the linear domain on the converted data 15a, to obtain the converted data 15b. For example, the HLG conversion parameter may be a parameter of an HLG curve. For a pixel in the converted data 15a, inverse mapping is separately performed on data of each of the three channels of R, G, and B of the pixel via the HLG curve, to perform conversion from the HLG domain to the linear domain on the data of each of the three channels of R, G, and B of the pixel. In this manner, conversion from the HLG domain to the linear domain may be performed on data of each of three channels of R, G, and B of each pixel in the converted data 15a. In this case, the converted data 15b is a two-dimensional picture in which a single pixel includes three channels of R, G, and B, where data of each of the three channels of R, G, and B of each pixel belongs to the linear domain.

S508: Perform inverse normalization, that is, performing inverse normalization on the converted data 15b obtained in S507, to obtain the converted data 15c.

For example, inverse normalization may be performed on the converted data 15b based on a normalization parameter, to obtain the converted data 15c.

For example, the normalization parameter may have a type identifier, and the type identifier may uniquely identify a normalization type. When it is determined, based on the type identifier of the normalization parameter, whether fixed parameter normalization, adaptive normalization, or maximum value normalization is performed in an encoding process, for one pixel in the converted data 15b, data of each of three channels of R, G, and B of the pixel may be divided by the normalization parameter, to perform inverse normalization on the data of each of the three channels of R, G, and B of the pixel. Further, in this manner, inverse normalization may be performed on data of each of three channels of R, G, and B of each pixel in the converted data 15b.

For example, when it is determined, based on the type identity of the normalization parameter, that min-max normalization is performed in the encoding process, in a possible manner, the normalization parameter may include a maximum value and a minimum value that correspond to the R channel, a maximum value and a minimum value that correspond to the G channel, and a maximum value and a minimum value that correspond to the B channel. For data of an R channel of a pixel in the converted data 15b, a difference Q1 between a maximum value and a minimum value that correspond to the R channel may be calculated, a product C1 of the data of the R channel of the pixel and the difference Q1 is calculated, and a sum of the product C1 and the minimum value is calculated, to obtain data, obtained through inverse normalization, of the R channel of the pixel. In this way, inverse normalization can be performed on the data of the R channel of the pixel. For data of the G channel and data of the B channel of the pixel, inverse normalization may be performed in the foregoing manner, to perform inverse normalization on data of each of three channels of R, G, and B of a pixel in the two-dimensional picture. Similarly, in this manner, inverse normalization may be performed on the data of each of the three channels of R, G, and B of each pixel in the two-dimensional picture.

For example, when it is determined, based on the type identity of the normalization parameter, that min-max normalization is performed in the encoding process, in a possible manner, the normalization parameter may include maximum values and minimum values that correspond to all channels. For data of an R channel of a pixel in the converted data 15b, a difference Q2 between the maximum values and the minimum values that correspond to all channels may be calculated, a product C2 of the data of the R channel of the pixel and the difference Q2 is calculated, and a sum of the product C2 and the minimum values is calculated, to obtain data, obtained through inverse normalization, of the R channel of the pixel, so as to perform inverse normalization on the data of the R channel of the pixel. For data of the G channel and data of the B channel of the pixel, inverse normalization may be performed in the foregoing manner, to perform inverse normalization on data of each of three channels of R, G, and B of a pixel in the converted data 15b. Similarly, in this manner, inverse normalization may be performed on the data of each of the three channels of R, G, and B of each pixel in the converted data 15b.

For example, when it is determined, based on the type identity of the normalization parameter, that z-score normalization is performed in a decoding process, the normalization parameter may include a mean value and a standard deviation. For a pixel in the converted data 15b, data of an R channel of the pixel is multiplied by the standard deviation, to obtain a product H; and the product H is added to the mean value, to obtain data, obtained through inverse normalization, of the R channel of the pixel. In this manner, data, obtained through inverse normalization, of a G channel of the pixel and data, obtained through inverse normalization, of a B channel of the pixel may be obtained. Similarly, in this manner, data, obtained through inverse normalization, of each of the three channels of R, G, and B of each pixel in the converted data 15b may be determined.

In this way, the obtained converted data 15c is also a two-dimensional picture in which a single pixel includes three channels of R, G, and B, where data of each channel of each pixel is data obtained through inverse normalization.

S509: Perform format conversion, that is, converting a data format of the converted data 15c obtained in S508 into a data storage format of the first device, to obtain the illumination data.

For example, the data storage format of the first device may be obtained, and then the data format of the converted data 15c may be converted based on the data storage format of the first device, to obtain the illumination data.

For example, the data storage format of the first device is RGB16F (an R channel, a B channel, and a G channel each are represented by a 16-bit floating point number), and a data format of the converted data 15c is RGB12 (an R channel, a B channel, and a G channel each are represented by a 12-bit unsigned type). In this case, an RGB format of each pixel in the two-dimensional picture may be converted from RGB12 to RGB16F.

In this way, the obtained illumination data is a two-dimensional picture in which a single pixel includes three channels of R, G, and B, each probe corresponds to a plurality of pixels in the two-dimensional picture, and illumination data of each probe includes a plurality of pixels.

It should be noted that the illumination data obtained in S509 is a two-dimensional picture in which a single pixel includes three channels of R, G, and B, and data of an A channel may be added to the illumination data based on a requirement. In this way, the obtained illumination data is a two-dimensional picture including four channels of R, G, B, and A. This is not limited in this application.

It should be understood that, because data storage formats of the first device and the second device are different, a data format of probe data obtained by the first device through decoding may be the same as or different from a data format of probe data encoded by the second device. This is not limited in this application.

It should be noted that a sequence of the four operations S505 to S508 may be randomly adjusted. This is not limited in this application.

Figure 6:
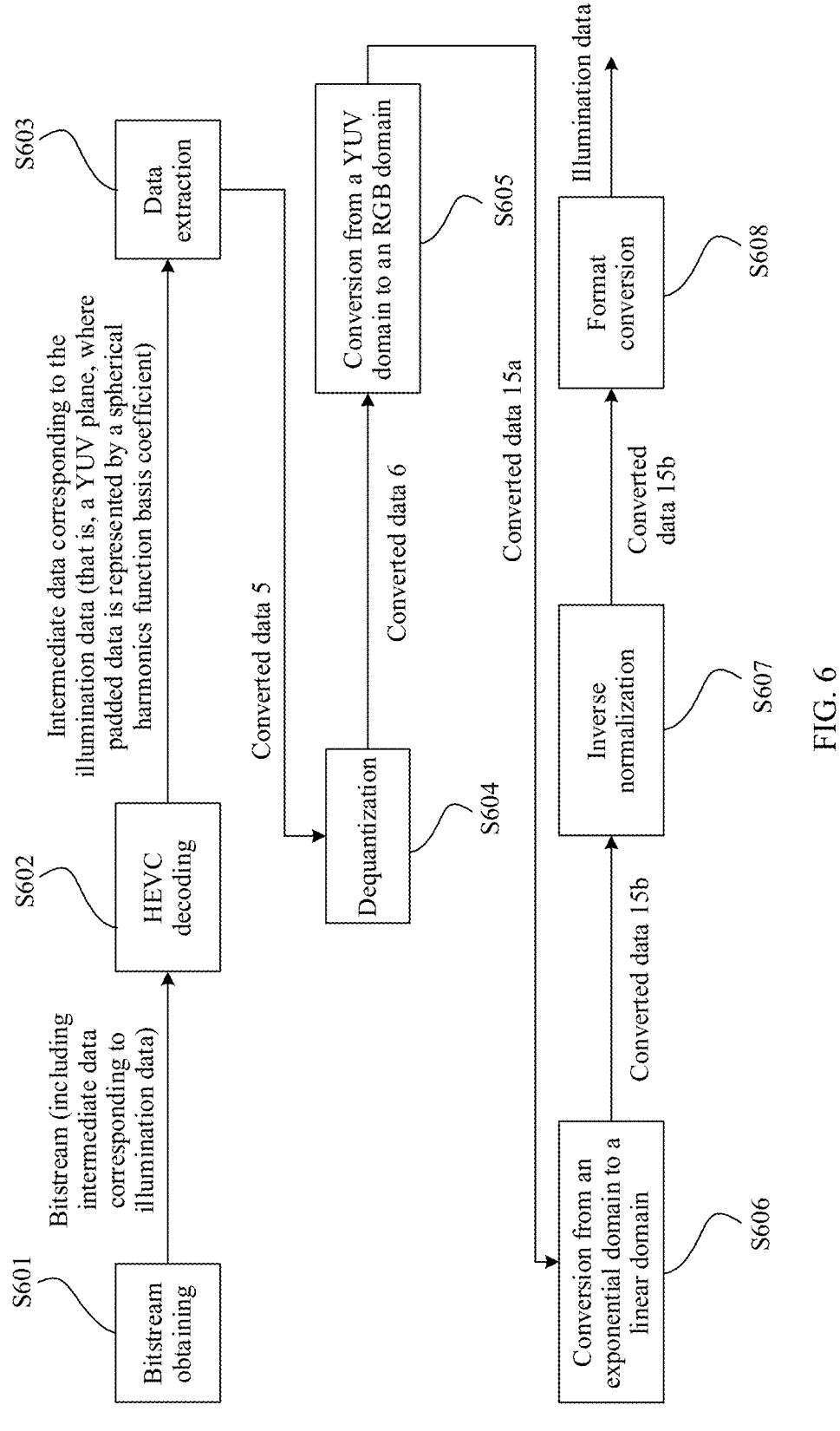
FIG. 6 is a diagram of an example of a decoding procedure.

FIG. 6 is a diagram of an example of a decoding procedure. The decoding procedure may include the following operations: S601: Obtain a bitstream. S602: Perform HEVC decoding. S603: Perform data extraction. S604: Perform dequantization. S605: Perform conversion from a YUV domain to an RGB domain. S606: Perform conversion from an exponential domain to a linear domain. S607: Perform inverse normalization. S608: Perform format conversion. In an embodiment in FIG. 6, intermediate data is data represented by a spherical harmonics function basis coefficient. The converted data 15 includes converted data 15a, converted data 15b, and converted data 15c.

S601: Obtain the bitstream, that is, bitstream obtaining, where the bitstream includes intermediate data corresponding to illumination data encoded by a second device.

S602: Perform HEVC decoding, that is, performing HEVC decoding on the bitstream obtained in S601, to obtain the intermediate data corresponding to the illumination data, where the intermediate data is data on a YUV plane, and data padded to the YUV plane is represented by a spherical harmonics function basis coefficient.

For example, for S602, refer to the descriptions about S502. Details are not described herein again.

In the embodiment in FIG. 6, the intermediate data is the data on the YUV plane, the data padded to the YUV plane may be data of three channels of Y, U, and V, where data of each of the three channels of Y, U, and V is represented by a spherical harmonics function basis coefficient.

It should be noted that the data of each of the three channels of Y, U, and V may alternatively be represented by a spherical wavelet basis coefficient or a transform coefficient corresponding to another transform basis. This is not limited in this application. The following provides descriptions by using an example in which the data, padded to the YUV plane, of each of the three channels of Y, U, and V is represented by a spherical harmonics function basis coefficient.

S603: Perform data extraction, that is, extracting data from the YUV plane obtained in S602, to obtain the converted data 5.

For example, the data extracted from the YUV plane may include the converted data 5 corresponding to illumination data of each probe. The converted data 5 corresponding to the illumination data of each probe may include spherical harmonics function basis coefficients of the three channels of Y, U, and V, where each channel includes x spherical harmonics function basis coefficients.

In a rendering process, the first device may determine shading effect of an object in a three-dimensional scene based on a spherical harmonics function basis and a corresponding spherical harmonics function basis coefficient. Therefore, after the data is extracted from the YUV plane, the data extracted from the YUV plane is directly dequantized without being arranged into a two-dimensional picture, that is, S604 is directly performed.

S604: Perform dequantization, that is, dequantizing the converted data 5 obtained in S603, to obtain the converted data 6.

For example, for the converted data 5 corresponding to illumination data of a probe, each spherical harmonics function basis coefficient of each of three channels of Y, U, and V in the converted data 5 may be dequantized based on a quantization parameter, to obtain the converted data 6 corresponding to the illumination data of the probe. Each spherical harmonics function basis coefficient of each of three channels of Y, U, and V in the converted data 5 may be dequantized through dequantization to a range of $[0, 1]$. Further, in this manner, the converted data 5 corresponding to the illumination data of all probes may be dequantized, to obtain the converted data 6 corresponding to the illumination data of all probes. The converted data 6 corresponding to the illumination data of each probe may include spherical harmonics function basis coefficients of three channels of Y, U, and V. Each channel includes x spherical harmonics function basis coefficients, each spherical harmonics function basis coefficient in each channel is a dequantized value, and each spherical harmonics function basis coefficient in each channel belongs to [0, 1].

S605: Perform conversion from a YUV domain to an RGB domain, that is, performing conversion from the YUV domain to the RGB domain on the converted data 6 obtained in S604, to obtain the converted data 15*a*.

For example, for S605, refer to the descriptions about S506. Details are not described herein again.

Conversion from the YUV domain to the RGB domain is performed on the converted data 6 corresponding to the illumination data of each probe, to obtain the converted data 15*a* corresponding to the illumination data of each probe. The converted data 15*a* corresponding to the illumination data of each probe may include spherical harmonics function basis coefficients of the three channels of R, G, and B, and each channel includes x spherical harmonics function basis coefficients.

S606: Perform conversion from an exponential domain to a linear domain, that is, performing conversion from the exponential domain to the linear domain on the converted data 15*a* obtained in S605, to obtain the converted data 15*b*.

For example, for S606, refer to the descriptions about S507. Details are not described herein again.

For example, conversion from the exponential domain to the linear domain is performed on the converted data 15*a* corresponding to the illumination data of each probe, to obtain the converted data 15*b* corresponding to the illumination data of each probe. The converted data 15*b* corresponding to the illumination data of each probe may include spherical harmonics function basis coefficients of the three channels of R, G, and B, where each channel includes x spherical harmonics function basis coefficients, and each spherical harmonics function basis coefficient belongs to the linear domain.

S607: Perform inverse normalization, that is, performing min-max inverse normalization on the converted data 15*b* obtained in S606, to obtain the converted data 15*c*.

In a possible manner, normalization parameters include x normalization parameters (including a maximum value and a minimum value) separately corresponding to x spherical harmonics function bases in the R channel, x normalization parameters (including a maximum value and a minimum value) separately corresponding to x spherical harmonics function bases in the G channel, and x normalization parameters (including a maximum value and a minimum value) separately corresponding to x spherical harmonics function bases in the B channel. For example, a difference Q3 between a maximum value and a minimum value that correspond to an $i^h$ (a value of i is from 1 to x, and i is an integer) spherical harmonics function basis in the R channel may be calculated. Then, for the $i^{th}$ spherical harmonics function basis coefficient in the R channel in the converted data 15*b* corresponding to illumination data of a probe, a product of the $i^{th}$ spherical harmonics function basis coefficient and the difference Q3 is calculated, to obtain a product value F5; and the product value F5 is added to a minimum value, to obtain a value of the $i^h$ spherical harmonics function basis coefficient, obtained through inverse normalization, in the R channel in the converted data 15*b* corresponding to the illumination data of the probe. In this way, inverse normalization may be performed on an $i^{th}$ spherical harmonics function basis coefficient in an R channel in the converted data 15*b* corresponding to illumination data of each probe. Similarly, inverse normalization may be performed on x spherical harmonics function basis coefficient in the G channel and the B channel in the converted data 15*b* corresponding to illumination data of each probe in the foregoing manner of performing inverse normalization on x spherical harmonics function basis coefficient in the R channel in the converted data 15*b* corresponding to illumination data of each probe, to obtain the converted data 15*c* corresponding to the illumination data of all probes. The converted data 15*c* corresponding to the illumination data of each probe may also include spherical harmonics function basis coefficients of the three channels of R, G, and B, where each channel includes x spherical harmonics function basis coefficients, and each spherical harmonics function basis coefficient is a value obtained through inverse normalization.

In a possible manner, normalization parameters include x normalization parameters (including a maximum value and a minimum value) separately corresponding to x spherical harmonics function bases shared by the three channels of R, G, and B. A difference Q4 between a maximum value and a minimum value that correspond to an $i^{th}$ (a value of i is from 1 to x, and i is an integer) spherical harmonics function basis may be calculated. Then, for the $i^{th}$ spherical harmonics function basis coefficient in the R channel in the converted data 15*b* corresponding to illumination data of a probe, a product of the $i^{th}$ spherical harmonics function basis coefficient and the difference Q4 is calculated, to obtain a product value F6; and the product value F6 is added to a minimum value, to obtain a value of the $i^{th}$ spherical harmonics function basis coefficient, obtained through inverse normalization, in the R channel in the converted data 15*b* corresponding to the illumination data of the probe. In this way, inverse normalization may be performed on an $i^{th}$ spherical harmonics function basis coefficient in an R channel in the converted data 15*b* corresponding to illumination data of each probe. Similarly, inverse normalization may be performed on x spherical harmonics function basis coefficient in the G channel and the B channel in the converted data 15*b* corresponding to illumination data of each probe in the foregoing manner of performing inverse normalization on x spherical harmonics function basis coefficient in the R channel in the converted data 15*b* corresponding to illumination data of each probe, to obtain the converted data 15*c* corresponding to the illumination data of each probe. The converted data 15*c* corresponding to the illumination data of each probe may also include spherical harmonics function basis coefficients of the three channels of R, G, and B, where each channel includes x spherical harmonics function basis coefficients, and each spherical harmonics function basis coefficient is a value obtained through inverse normalization.

S608: Perform format conversion, that is, converting a data format of the converted data 15*c* obtained in S607 into a data storage format of the first device, to obtain the illumination data.

For example, for S608, refer to the descriptions about 509. Details are not described herein again. The obtained illumination data of each probe includes spherical harmonics function basis coefficients of the three channels of R, G, and B, where each channel includes x spherical harmonics function basis coefficients.

It should be noted that data (which may include x spherical harmonics function basis coefficients) of an A channel may be added to the illumination data of each probe based on a requirement. In this way, the obtained illumination data includes spherical harmonics function basis coefficients of four channels of R, G, B, and A, where each channel includes x spherical harmonics function basis coefficients.

It should be noted that a sequence of the four operations S604 to S607 may be randomly adjusted. This is not limited in this application.

The following uses the decoding procedure shown in FIG. 4c(5) as an example to describe in detail a process of obtaining the visibility data through decoding.

Figure 7:
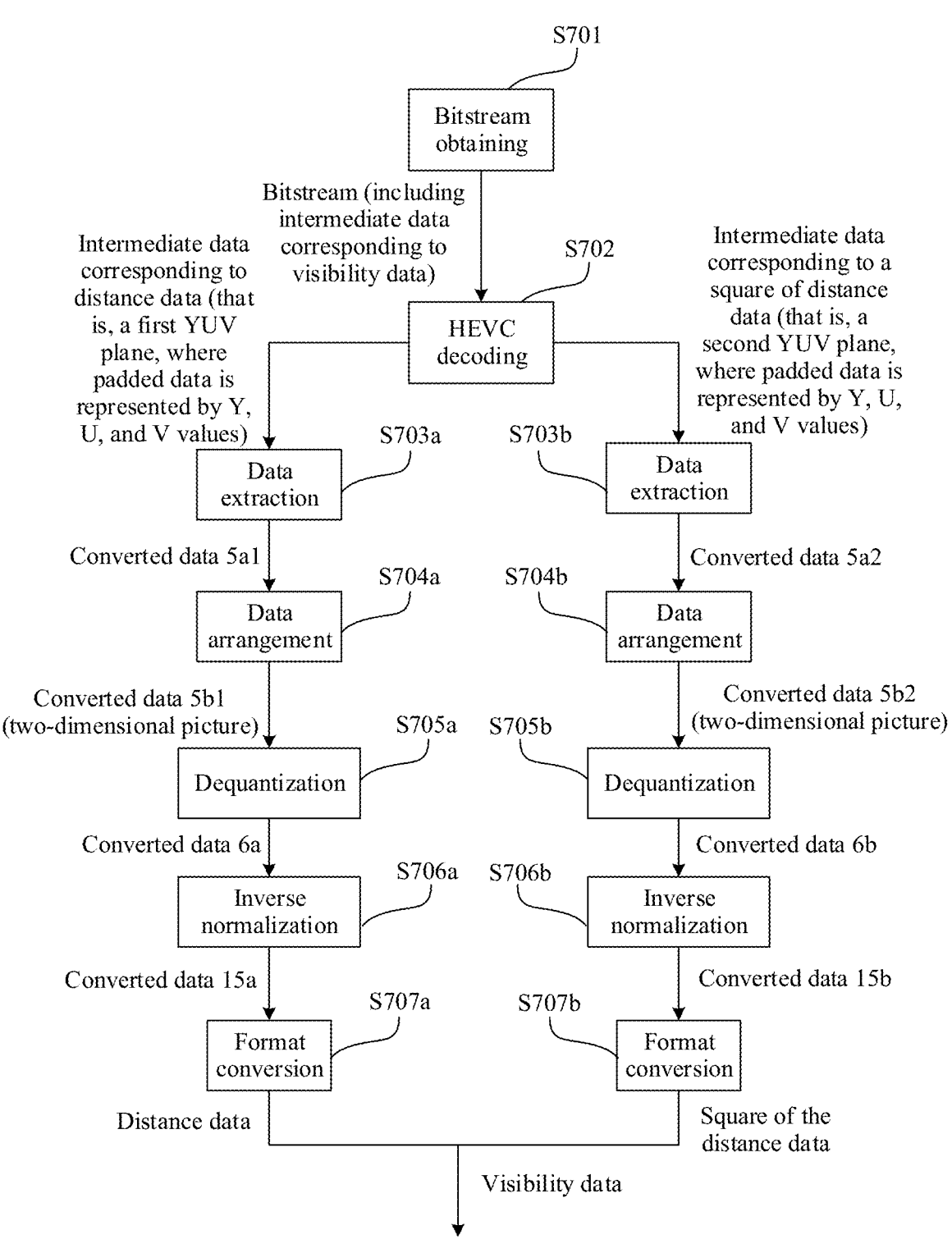
FIG. 7 is a diagram of an example of a decoding procedure.

FIG. 7 is a diagram of an example of a decoding procedure. The decoding procedure may include the following operations: S701: Obtain a bitstream. S702: Perform HEVC decoding. S703a: Perform data extraction. S703b: Perform data extraction. S704a: Perform data arrangement. S704b: Perform data arrangement. S705a: Perform dequantization. S705b: Perform dequantization. S706a: Perform inverse normalization. S706b: Perform inverse normalization. S707a: Perform format conversion. S707b: Perform format conversion. In an embodiment in FIG. 7, visibility data may include distance data and a square of the distance data, and intermediate data is represented by Y, U, and V values. The converted data 5 includes converted data 5a1, converted data 5a2, converted data 5b1, and converted data 5b2; the converted data 6 includes converted data 6a and converted data 6b; and the converted data 15 includes converted data 15a and converted data 15b.

S701: Obtain the bitstream, that is, bitstream obtaining, where the bitstream includes intermediate data corresponding to visibility data encoded by a second device.

For example, the bitstream may include intermediate data corresponding to distance data and intermediate data corresponding to a square of the distance data. The intermediate data corresponding to the distance data corresponds to K probes, and the intermediate data corresponding to the square of the distance data corresponds to the K probes.

S702: Perform HEVC decoding, that is, performing HEVC decoding on the bitstream obtained in S701, to obtain the intermediate data corresponding to the visibility data, where the intermediate data is represented by Y, U, and V values.

For example, HEVC decoding is performed on the bitstream, to obtain the intermediate data corresponding to the distance data of the K probes and the intermediate data corresponding to the square of the distance data of the K probes.

For example, for S702, refer to the descriptions about S502. Details are not described herein again.

In the embodiment in FIG. 7, the intermediate data is data on the YUV plane.

The intermediate data corresponding to the distance data of the K probes may be data on a YUV plane (which may be referred to as a first YUV plane subsequently), and the intermediate data corresponding to the square of the distance data of the K probes may be data on another YUV plane (which may be referred to as a second YUV plane subsequently).

For example, for descriptions about the first YUV plane and the second YUV plane, refer to the descriptions about the YUV plane in the foregoing embodiments. Details are not described herein again.

In the embodiment in FIG. 7, data padded to the first YUV plane may be data of three channels of Y, U, and V, where data of each of the three channels of Y, U, and V is represented by Y, U, and V values; and data padded to the second YUV plane may be data of three channels of Y, U, and V, where data of each of the three channels of Y, U, and V is represented by Y, U, and V values.

S703a: Perform data extraction, that is, extracting data from the first YUV plane obtained in S702, to obtain the converted data 5a1.

S703b: Perform data extraction, that is, extracting data from the second YUV plane obtained in S702, to obtain the converted data 5a2.

For example, for S703a and S703b, refer to the descriptions about S503. Details are not described herein again.

It should be noted that S703a and S703b may be performed in parallel or in serial. This is not limited in this application.

S704a: Perform data arrangement, that is, arranging the converted data 5a1 obtained in S703a into a two-dimensional picture, to obtain the converted data 5b1.

S704b: Perform data arrangement, that is, arranging the converted data 5a2 obtained in S703b into a two-dimensional picture, to obtain the converted data 5b2.

For example, for S704a and S704b, refer to the descriptions about S504. Details are not described herein again.

It should be noted that S704a and S704b may be performed in parallel or in serial. This is not limited in this application.

S705a: Perform dequantization, that is, dequantizing the converted data 5b1 obtained in S704a, to obtain the converted data 6a.

S705b: Perform dequantization, that is, dequantizing the converted data 5b2 obtained in S704b, to obtain the converted data 6b.

For example, for S705a and S705b, refer to the descriptions about S505. Details are not described herein again.

It should be noted that S705a and S705b may be performed in parallel or in serial. This is not limited in this application.

S706a: Perform inverse normalization, that is, performing inverse normalization on the converted data 6a obtained in S705a, to obtain the converted data 15a.

S706b: Perform inverse normalization, that is, performing inverse normalization on the converted data 6b obtained in S705b, to obtain the converted data 15b.

For example, for S706a and S706b, refer to the descriptions about S508. Details are not described herein again.

It should be noted that S706a and S706b may be performed in parallel or in serial. This is not limited in this application.

S707a: Perform format conversion, that is, converting a data format of the converted data 15a obtained in S706a into a data storage format of the first device, to obtain the distance data.

S707b: Perform format conversion, that is, converting a data format of the converted data 15b obtained in S706b into the data storage format of the first device, to obtain the square of the distance data.

For example, for S707a and S707b, refer to the descriptions about S509. Details are not described herein again.

It should be noted that S707a and S707b may be performed in parallel or in serial. This is not limited in this application.

It should be noted that, after the converted data 15a and the converted data 15b are obtained, the converted data 15a may be used as an R channel, the converted data 15b may be used as a G channel, and channel combination is performed on the converted data 15a and the converted data 15b, to obtain the converted data 15. The converted data 15 may be a two-dimensional picture in which a single pixel includes two channels of R and G. Then, a data format of the converted data 15 may be converted into the data storage format of the first device, to obtain the distance data and the square of the distance data. It is clear that, after the converted data 5*b*1 and the converted data 5*b*2 are obtained, the converted data 5*b*1 may be used as an R channel, the converted data 5*b*2 may be used as a G channel, and channel combination is performed on the converted data 5*b*1 and the converted data 5*b*2, to obtain the converted data 5. The converted data 5 may be a two-dimensional picture in which a single pixel includes two channels of R and G. Subsequently, subsequent S705*a*, S706*a*, and S707*a* (or S705*b*, S706*b*, and S707*b*) are performed. This is not limited in this application.

Figure 8:
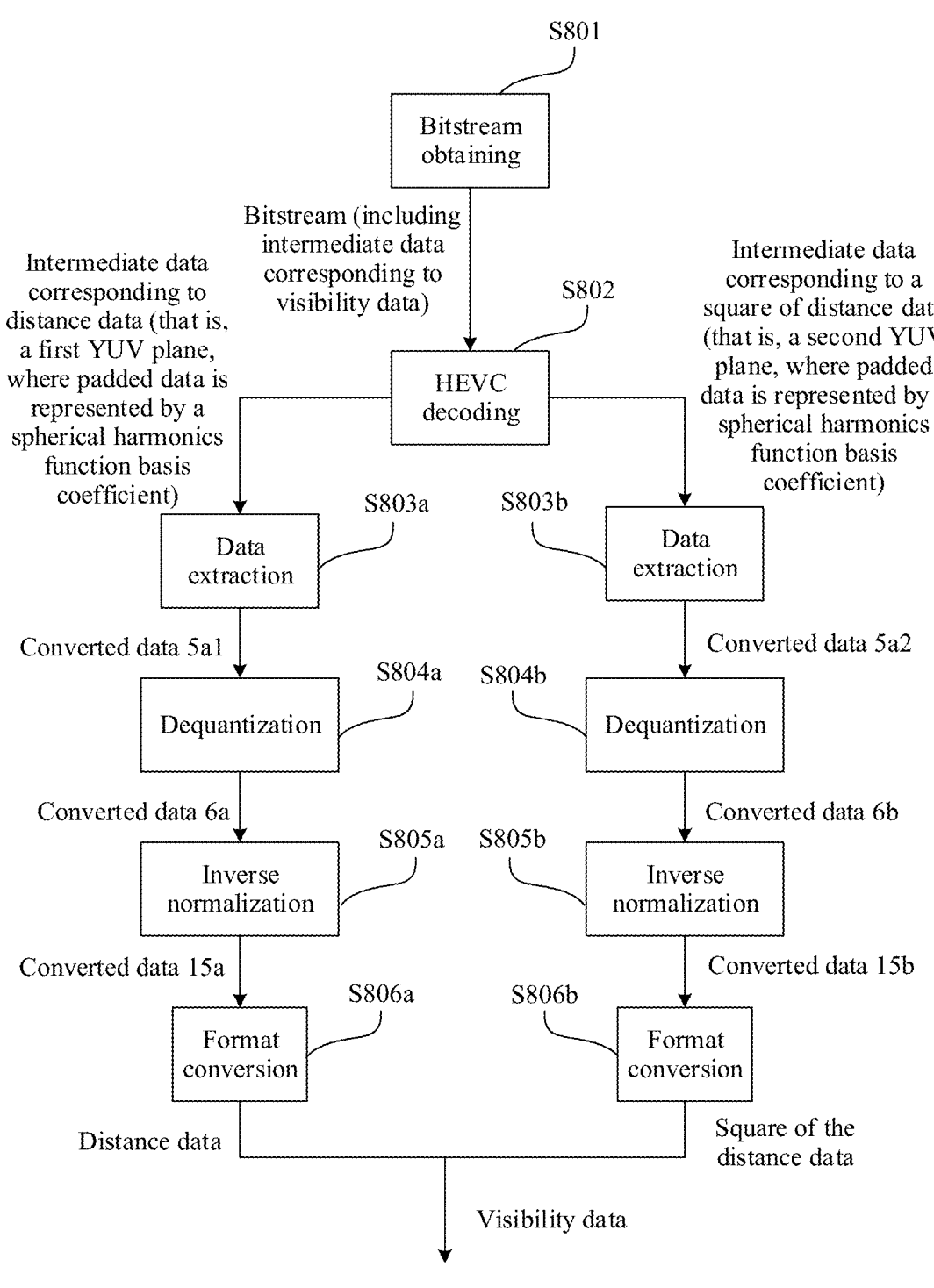
FIG. 8 is a diagram of an example of a decoding procedure.

FIG. 8 is a diagram of an example of a decoding procedure. The decoding procedure may include the following operations: S801: Obtain a bitstream. S802: Perform HEVC decoding. S803*a*: Perform data extraction. S803*b*: Perform data extraction. S804*a*: Perform dequantization. S804*b*: Perform dequantization. S805*a*: Perform inverse normalization. S805*b*: Perform inverse normalization. S806*a*: Perform format conversion. S806*b*: Perform format conversion. In an embodiment in FIG. 8, visibility data may include distance data and a square of the distance data, and intermediate data is represented by a spherical harmonics function basis coefficient. The converted data 5 includes converted data 5*a*1 and converted data 5*a*2; the converted data 6 includes converted data 6*a* and converted data 6*b*; and the converted data 15 includes converted data 15*a* and converted data 15*b*.

S801: Obtain the bitstream, that is, bitstream obtaining, where the bitstream includes intermediate data corresponding to visibility data encoded by a second device.

For example, the bitstream may include intermediate data corresponding to distance data and intermediate data corresponding to a square of the distance data. The intermediate data corresponding to the distance data corresponds to K probes, and the intermediate data corresponding to the square of the distance data corresponds to the K probes.

S802: Perform HEVC decoding, that is, performing HEVC decoding on the bitstream obtained in S801, to obtain the intermediate data corresponding to the visibility data, where the intermediate data is represented by Y, U, and V values.

For example, HEVC decoding is performed on the bitstream, to obtain the intermediate data corresponding to the distance data of the K probes and the intermediate data corresponding to the square of the distance data of the K probes.

For example, for S802, refer to the descriptions about S502. Details are not described herein again.

In the embodiment in FIG. 8, the intermediate data is data on the YUV plane.

The intermediate data corresponding to the distance data of the K probes may be data on a YUV plane (which may be referred to as a first YUV plane subsequently), and the intermediate data corresponding to the square of the distance data of the K probes may be data on another YUV plane (which may be referred to as a second YUV plane subsequently).

For example, for descriptions about the first YUV plane and the second YUV plane, refer to the descriptions about the YUV plane in the foregoing embodiments. Details are not described herein again.

For example, in the embodiment in FIG. 7, the data padded to the first YUV plane may be data of three channels of Y, U, and V, where data of each of the three channels of Y, U, and V is represented by a spherical harmonics function basis coefficient (or a spherical wavelet basis coefficient).

The data padded to the second YUV plane may be data of three channels of Y, U, and V, where data of each of the three channels of Y, U, and V is represented by a spherical harmonics function basis coefficient (or a spherical wavelet basis coefficient).

S803*a*: Perform data extraction, that is, extracting data from the first YUV plane obtained in S802, to obtain the converted data 5*a*1.

S803*b*: Perform data extraction, that is, extracting data from the second YUV plane obtained in S802, to obtain the converted data 5*a*2.

For example, for S803*a* and S803*b*, refer to the descriptions about S503. Details are not described herein again.

It should be noted that S803*a* and S803*b* may be performed in parallel or in serial. This is not limited in this application.

S804*a*: Perform dequantization, that is, dequantizing the converted data 5*b*1 obtained in S803*a*, to obtain the converted data 6*a*.

S804*b*: Perform dequantization, that is, dequantizing the converted data 5*b*2 obtained in S803*b*, to obtain the converted data 6*b*.

For example, for S804*a* and S804*b*, refer to the descriptions about S604. Details are not described herein again.

It should be noted that S804*a* and S804*b* may be performed in parallel or in serial. This is not limited in this application.

S805*a*: Perform inverse normalization, that is, performing inverse normalization on the converted data 6*a* obtained in S804*a*, to obtain the converted data 15*a*.

S805*b*: Perform inverse normalization, that is, performing inverse normalization on the converted data 6*b* obtained in S804*b*, to obtain the converted data 15*b*.

For example, for S805*a* and S805*b*, refer to the descriptions about S607. Details are not described herein again.

It should be noted that S805*a* and S805*b* may be performed in parallel or in serial. This is not limited in this application.

S806*a*: Perform format conversion, that is, converting a data format of the converted data 15*a* obtained in S805*a* into a data storage format of the first device, to obtain the distance data.

S806*b*: Perform format conversion, that is, converting a data format of the converted data 15*b* obtained in S805*b* into the data storage format of the first device, to obtain the square of the distance data.

For example, for S806*a* and S806*b*, refer to the descriptions about S509. Details are not described herein again.

It should be noted that S806*a* and S806*b* may be performed in parallel or in serial. This is not limited in this application.

It should be noted that, after the converted data 15*a* and the converted data 15*b* are obtained, the converted data 15*a* may be used as an R channel, the converted data 15*b* may be used as a G channel, and channel combination is performed on the converted data 15*a* and the converted data 15*b*, to obtain the converted data 15. The converted data 15 may include spherical harmonics function basis coefficients of the two channels of R and G. Then, a data format of the converted data 15 may be converted into the data storage format of the first device, to obtain the distance data and the square of the distance data. It is clear that, after the converted data 5*a*1 and the converted data 5*a*2 are obtained, the converted data 5*a*1 may also be used as an R channel, the converted data 5*a*2 may be used as a G channel, and channel combination is performed on the converted data 5*a*1 and the converted data 5*a*2, to obtain the converted data 5. The converted data 5 may include spherical harmonics function basis coefficients of the two channels of R and G. Subsequently, subsequent S804*a*, S805*a*, and S806*a* (or S804*b*, S805*b*, and S805*b*) are performed. This is not limited in this application.

The following uses the decoding procedure shown in FIG. 4*c*(2) as an example to describe in detail a process of obtaining the probe data through decoding.

Figure 9:
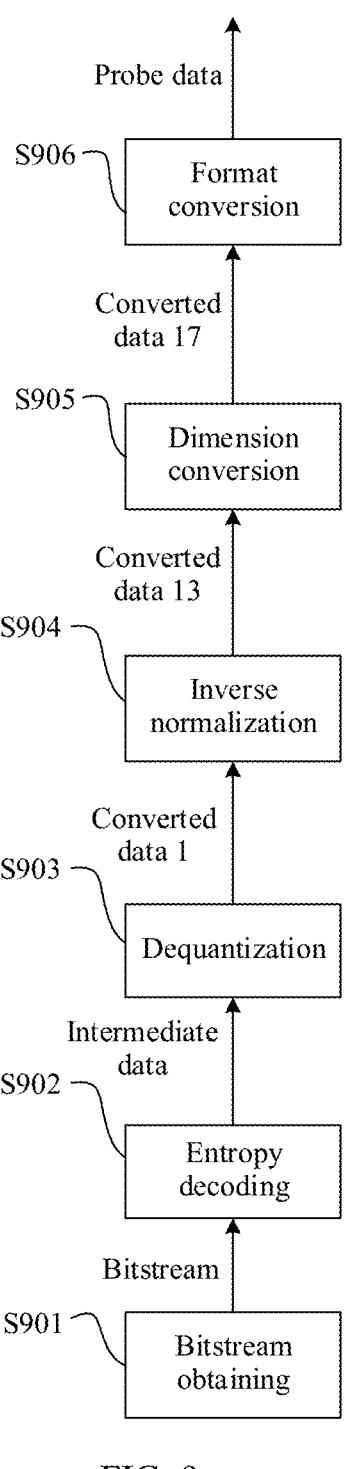
FIG. 9 is a diagram of an example of a decoding procedure.

FIG. 9 is a diagram of an example of a decoding procedure. The decoding procedure may include the following operations: S901: Obtain a bitstream. S902: Perform entropy decoding. S903: Perform dequantization. S904: Perform inverse normalization. S905: Perform dimension conversion. S906: Perform format conversion.

S901: Obtain the bitstream, that is, bitstream obtaining.

For example, the bitstream may include intermediate data corresponding to illumination data of K probes and/or intermediate data corresponding to visibility data of the K probes.

S902: Perform entropy decoding, that is, performing entropy decoding on the bitstream obtained in S901, to obtain intermediate data corresponding to probe data.

For example, for S902, refer to the descriptions about S502. Details are not described herein again.

In an embodiment in FIG. 9, the intermediate data is a two-dimensional matrix. It should be understood that the intermediate data may alternatively be a matrix of another dimension (for example, a five-dimensional matrix). This is not limited in this application. The following provides descriptions by using an example in which the intermediate data is a two-dimensional matrix.

For example, the intermediate data corresponding to the illumination data of the K probes may include a two-dimensional matrix 11 in which an element is represented by an eigenvector coefficient and a two-dimensional matrix 12 in which an element is represented by an eigenvector. Each element in the two-dimensional matrix 11 may be one eigenvector coefficient, and each element in the two-dimensional matrix 12 may be one eigenvector.

For example, the intermediate data corresponding to the visibility data of the K probes may be a two-dimensional matrix 21 in which an element is represented by an eigenvector coefficient and a two-dimensional matrix 22 in which an element is represented by an eigenvector. Each element in the two-dimensional matrix 21 may be one eigenvector coefficient, and each element in the two-dimensional matrix 22 may be one eigenvector.

S903: Perform dequantization, that is, dequantizing the intermediate data obtained in S902, to obtain the converted data 1.

For example, for S903, refer to the descriptions about S604. Details are not described herein again.

For example, when the intermediate data is the intermediate data corresponding to the illumination data, the eigenvector coefficient in the two-dimensional matrix 11 may be dequantized, to obtain a two-dimensional matrix 13, and the eigenvector in the two-dimensional matrix 12 may be dequantized, to obtain a two-dimensional matrix 14. In this way, the obtained converted data 1 includes the two-dimensional matrix 13 in which an element is represented by an eigenvector coefficient and the two-dimensional matrix 14 in which an element is represented by an eigenvector. Each element in the two-dimensional matrix 13 is a dequantized eigenvector coefficient, and each element in the two-dimensional matrix 14 is a dequantized eigenvector.

For example, when the intermediate data is the intermediate data corresponding to the visibility data, the eigenvec-tor coefficient in the two-dimensional matrix 21 may be dequantized, to obtain a two-dimensional matrix 23, and the eigenvector in the two-dimensional matrix 22 may be dequantized, to obtain a two-dimensional matrix 24. In this way, the obtained converted data 1 includes the two-dimensional matrix 23 in which an element is represented by an eigenvector coefficient and the two-dimensional matrix 24 in which an element is represented by an eigenvector. Each element in the two-dimensional matrix 23 is a dequantized eigenvector coefficient, and each element in the two-dimensional matrix 24 is a dequantized eigenvector.

S904: Perform inverse normalization, that is, performing inverse normalization on the converted data 1 obtained in S903, to obtain the converted data 13.

For example, for S904, refer to the descriptions about S604. Details are not described herein again.

For example, when the intermediate data is the intermediate data corresponding to the illumination data, inverse normalization may be performed on the eigenvector coefficient in the two-dimensional matrix 13, to obtain a two-dimensional matrix 15, and inverse normalization may be performed on the eigenvector in the two-dimensional matrix 14, to obtain a two-dimensional matrix 26. In this way, the obtained converted data 13 includes the two-dimensional matrix 15 in which an element is represented by an eigenvector coefficient and the two-dimensional matrix 16 in which an element is represented by an eigenvector. Each element in the two-dimensional matrix 15 is a dequantized eigenvector coefficient, and each element in the two-dimensional matrix 16 is a dequantized eigenvector.

For example, when the intermediate data is the intermediate data corresponding to the visibility data, inverse normalization may be performed on the eigenvector coefficient in the two-dimensional matrix 23, to obtain a two-dimensional matrix 25, and inverse normalization may be performed on the eigenvector in the two-dimensional matrix 24, to obtain a two-dimensional matrix 26. In this way, the obtained converted data 13 includes the two-dimensional matrix 25 in which an element is represented by an eigenvector coefficient and the two-dimensional matrix 26 in which an element is represented by an eigenvector. Each element in the two-dimensional matrix 25 is an eigenvector coefficient obtained through inverse normalization, and each element in the two-dimensional matrix 26 is a dequantized eigenvector.

It should be noted that, in a rendering process, the first device may determine shading effect of an object in a three-dimensional scene based on an eigenvector and a corresponding eigenvector coefficient without converting the eigenvector coefficient into a spherical harmonics function basis coefficient, a spherical wavelet basis coefficient, or a two-dimensional picture.

S905: Perform dimension conversion, that is, performing dimension conversion on the converted data 13 obtained in S904, to obtain converted data 17.

For example, when the intermediate data is the intermediate data corresponding to the illumination data, dimension conversion may be performed on the two-dimensional matrix 15, and an eigenvector coefficient corresponding to the illumination data of each probe is extracted from the two-dimensional matrix 15; and dimension conversion is performed on the two-dimensional matrix 16, and an eigenvector corresponding to the illumination data of each probe is extracted from the two-dimensional matrix 16. Then, an eigenvector and an eigenvector coefficient that correspond to the illumination data of a probe are arranged together.

For example, when the intermediate data is the intermediate data corresponding to the visibility data, dimension conversion may be performed on the two-dimensional matrix 25, and an eigenvector coefficient corresponding to the visibility data of each probe is extracted from the two-dimensional matrix 25; and dimension conversion is performed on the two-dimensional matrix 26, and an eigenvector corresponding to the illumination data of each probe is extracted from the two-dimensional matrix 26. Then, an eigenvector and the eigenvector coefficient that correspond to the visibility data of a probe are arranged together.

For example, data obtained by performing dimension conversion on the converted data 13 may be referred to as the converted data 17, and the converted data 17 may also be a matrix. It should be noted that the converted data 17 is an intermediate result generated in a process of first manner rearrangement in FIG. 4c(2).

For example, a quantity of elements that the converted data 17 needs may be determined, and dimension conversion is performed on the converted data 13 based on the quantity of elements that the converted data 17 needs and a quantity of elements in the converted data 13. For example, when it is determined that the quantity of elements that the converted data 17 needs is greater than the quantity of elements in the converted data 13, a quantity of invalid elements may be determined based on the quantity of elements that the converted data 17 needs and the quantity of elements in the converted data 13, and the invalid elements with the corresponding quantity are discarded in a process of performing dimension conversion on the converted data 13.

For example, if a size of the converted data 17 is 150*240, it may be determined that the quantity of elements that the converted data 17 needs is 36000. If a size of the converted data 13 is 190*190, it may be determined that the quantity of elements in the converted data 13 is 36100. In this case, in the process of performing dimension conversion on the converted data 13, 100 invalid elements may be discarded.

S906: Perform format conversion, that is, converting a data format of the converted data 17 obtained in S905 into a data storage format of the first device, to obtain the probe data.

For example, format conversion may be performed on an eigenvector coefficient and an eigenvector that correspond to illumination data in the converted data 17, to convert data formats of the eigenvector coefficient and the eigenvector that correspond to the illumination data into the data storage format of the first device. In this way, the eigenvector coefficient and the eigenvector that are obtained through format conversion and that correspond to the illumination data may form the illumination data.

For example, format conversion may be performed on an eigenvector coefficient and an eigenvector that correspond to visibility data in the converted data 17, to convert data formats of the eigenvector coefficient and the eigenvector that correspond to the visibility data into the data storage format of the first device. In this way, the eigenvector coefficient and the eigenvector that are obtained through format conversion and that correspond to the visibility data may form the visibility data.

Figure 10:
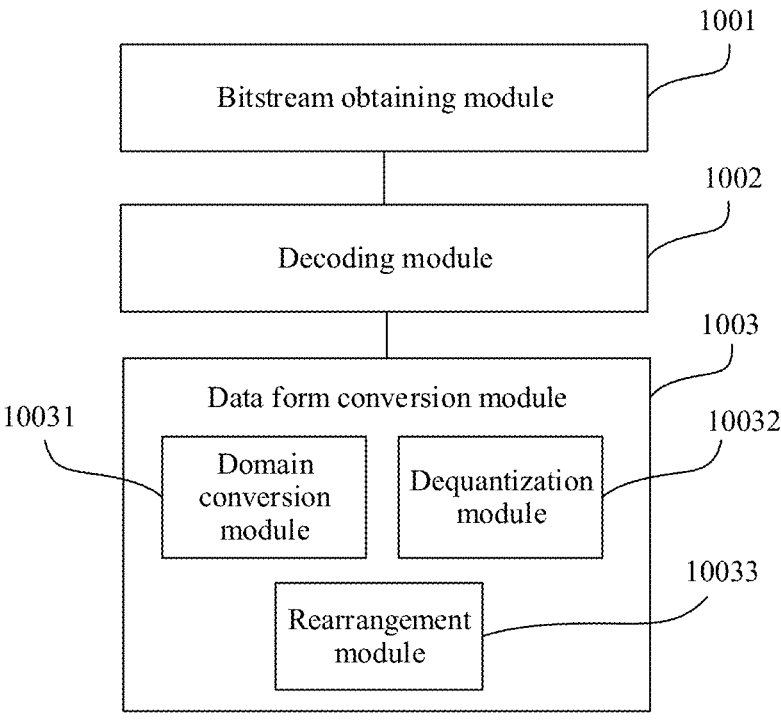
FIG. 10 is a diagram of an example of an electronic device.

FIG. 10 is a diagram of an example of an electronic device. In an embodiment in FIG. 10, the electronic device is a first device, and may be configured to perform the method in the foregoing embodiments. Therefore, for beneficial effect that can be achieved by the first device, refer to the beneficial effect in the corresponding method provided above. Details are not described herein again. The first device may include:

a bitstream obtaining module 1001, configured to obtain a bitstream, where the bitstream includes intermediate data encoded by a second device;

a decoding module 1002, configured to decode the bitstream, to obtain the intermediate data; and a data form conversion module 1003, configured to perform data form conversion on the intermediate data, to obtain probe data, where the probe data corresponds to one or more probes in a three-dimensional scene, and the probe data is for determining shading effect of an object in the three-dimensional scene in a rendering process, where the data form conversion includes domain conversion.

For example, the data form conversion module 1003 includes:

a domain conversion module 10031, configured to: perform first processing on the intermediate data, to obtain converted data, where the first processing is the domain conversion; or perform second processing on the converted data, to obtain the probe data, where the second processing is the domain conversion;

a dequantization module 10032, configured to: perform first processing on the intermediate data, to obtain converted data, where the first processing is dequantization; or perform second processing on the converted data, to obtain the probe data, where the second processing is dequantization; and a rearrangement module 10033, configured to: perform first processing on the intermediate data, to obtain converted data, where the first processing is first manner rearrangement; or perform second processing on the converted data, to obtain the probe data, where the second processing is first manner rearrangement.

For example, the domain conversion module 10031 is further configured to: after the second processing is performed on the converted data and before the probe data is obtained, perform third processing on the converted data obtained through second processing, where the third processing is the domain conversion.

The dequantization module 10032 is further configured to: after the second processing is performed on the converted data and before the probe data is obtained, perform third processing on the converted data obtained through second processing, where the third processing is the dequantization.

The rearrangement module 10033 is further configured to: after the second processing is performed on the converted data and before the probe data is obtained, perform third processing on the converted data obtained through second processing, where the third processing is the first manner rearrangement.

For example, the intermediate data is data on a YUV plane, the rearrangement module is further configured to: before first processing is performed on the intermediate data, perform second manner rearrangement on the intermediate data, where the second manner rearrangement includes extracting data from the YUV plane.

For example, the second manner rearrangement further includes arranging the data extracted from the YUV plane into a two-dimensional picture.

For example, when the intermediate data is the intermediate data corresponding to the illumination data, the first manner rearrangement includes at least one of the following: adding a channel to the intermediate data corresponding to the illumination data, converting the intermediate data corresponding to the illumination data into a data storage format of the first device, or performing dimension conversion on the intermediate data corresponding to the illumination data.

For example, when the intermediate data is the intermediate data corresponding to the visibility data, and the intermediate data corresponding to the visibility data includes a plurality of groups of channels, the first manner rearrangement includes at least one of the following: combining the plurality of groups of channels, converting the intermediate data corresponding to the visibility data into a data storage format of the first device, or performing dimension conversion on the intermediate data corresponding to the visibility data.

For example, the data form conversion module 1003 is configured to perform data form conversion on the intermediate data based on first attribute data obtained by decoding the bitstream, to obtain the probe data.

For example, the domain conversion includes at least one of the following: conversion from a normalized domain to a non-normalized domain, conversion from a non-linear domain to a linear domain, conversion from a YUV domain to an RGB domain, conversion from an XYZ domain to an RGB domain, and conversion from a Lab domain to an RGB domain.

For example, the bitstream further includes attribute data, encoded by the second device, of the probe, where the attribute data includes the first attribute data for data form conversion and/or second attribute data used in the rendering process.

For example, when the intermediate data includes the intermediate data corresponding to the illumination data and the intermediate data corresponding to the visibility data, the bitstream further includes bitstream structure information, where the bitstream structure information includes a location of the intermediate data corresponding to the illumination data and/or a location of the intermediate data corresponding to the visibility data.

For example, when the intermediate data includes the intermediate data corresponding to the illumination data and the intermediate data corresponding to the visibility data, the probe data includes the illumination data and/or the visibility data.

Figure 11A:
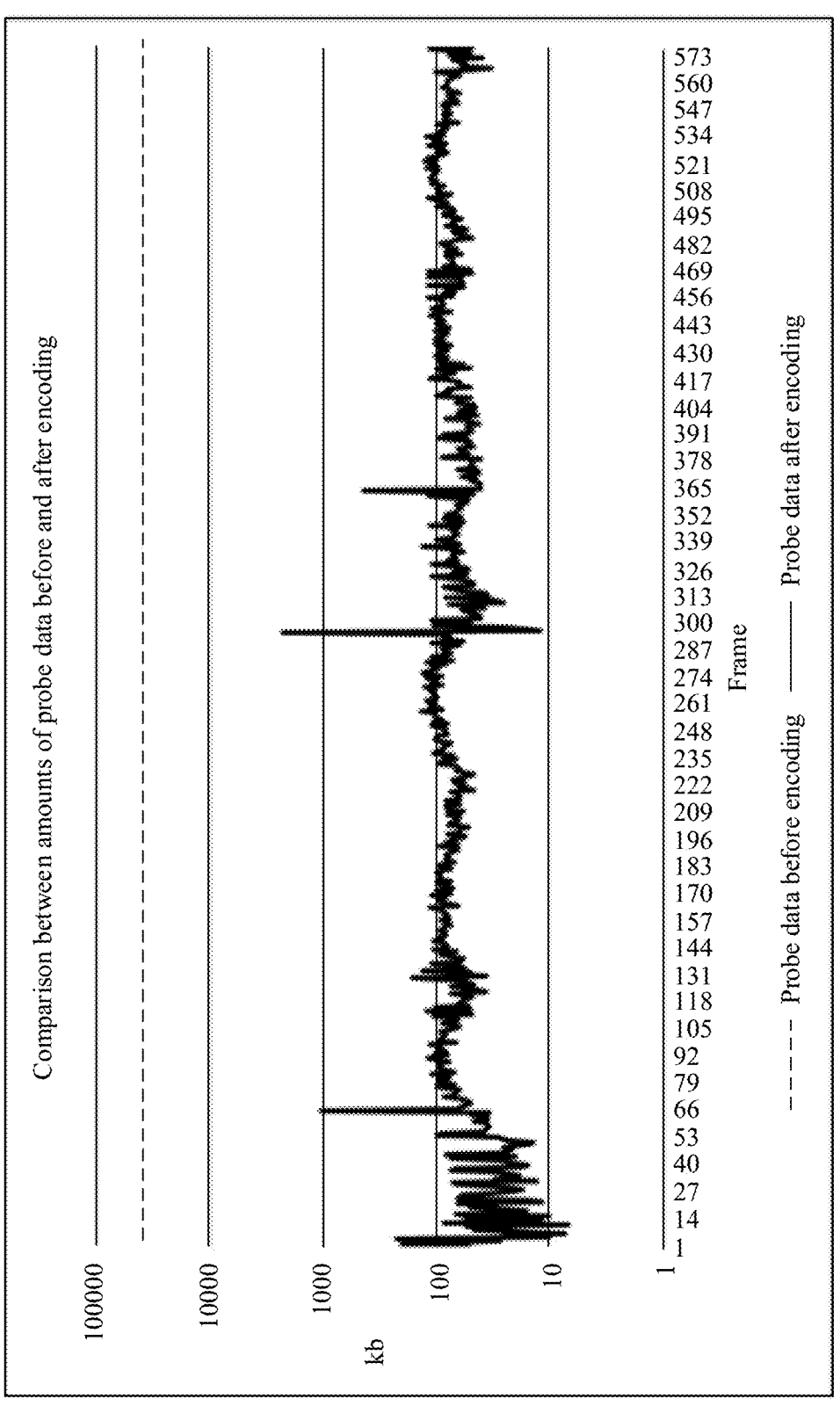
FIG. 11a is a diagram of an example of compression effect.

FIG. 11*a* is a diagram of an example of compression effect. In FIG. 11*a*, a vertical coordinate is a data amount in a unit of kb, and a horizontal coordinate is a frame.

Refer to FIG. 11*a*. For example, probe data before encoding is greater than 40000 kb. After encoding is performed by using an encoding method corresponding to the decoding method in this application, data amounts corresponding to bitstreams of most frames received by the first device belong to an interval of 8 kb to 100 kb, and data amounts of bitstreams corresponding to a few frames are about 2000 kb. It can be learned that the encoding method corresponding to the decoding method in this application can significantly reduce a bit rate, and reduce a data amount sent from the encoder side to the decoder side (the first device). Further, when the first device decodes the bitstream by using the decoding method in this application, a rendering delay of the first device can be reduced.

Figure 11B:
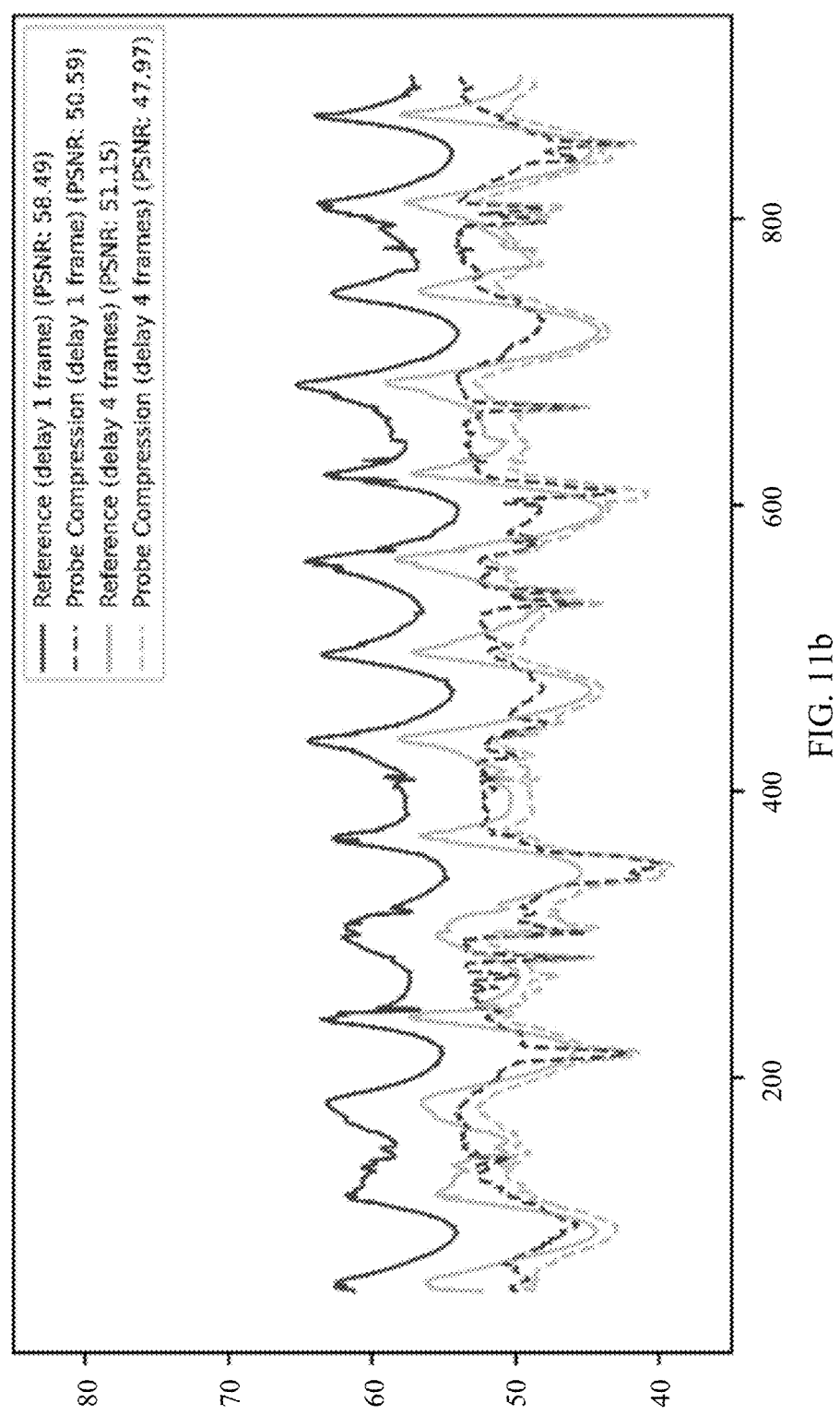
FIG. 11b is a diagram of an example of compression effect.

FIG. 11*b* is a diagram of an example of compression effect. FIG. 11*b* shows a PSNR (peak signal-to-noise ratio) curve corresponding to lossless compression and a PSNR curve corresponding to the decoding method in this application. A PSNR may indicate a difference between an unprocessed picture (a picture before compression performed by the encoder side in FIG. 11*b*) and a processed picture (a picture obtained by decoding, by the decoder side, a bitstream sent by the encoder side in FIG. 11*b*). A larger PSNR indicates a smaller loss of the processed picture compared with the unprocessed picture. The PSNR may be for measuring quality or rendering effect of a compressed or decompressed picture. In FIG. 11*b*, a vertical coordinate is a PSNR, and a horizontal coordinate is a quantity of frames.

Refer to FIG. 11*b*. For example, a curve corresponding to a reference (delay 1 frame) is a PSNR curve corresponding to lossless compression in the conventional technology in a case in which one frame is delayed, and an average PSNR of the lossless compression is 58.49 dB. A curve corresponding to probe compression (delay 1 frame) is a PSNR curve corresponding to lossy compression performed by using the encoding method corresponding to the decoding method in this application in a case in which one frame is delayed, and an average PSNR of the lossy compression is 50.59 dB. A curve corresponding to a reference (delay 4 frames) is a PSNR curve corresponding to lossless compression in the conventional technology in a case in which four frames are delayed, and an average PSNR of the lossless compression is 51.15 dB. A curve corresponding to probe compression (delay 4 frames) is a PSNR curve corresponding to lossy compression performed by using the encoding method corresponding to the decoding method in this application in a case in which four frames are delayed, and an average PSNR of the lossy compression is 47.97 dB.

It should be noted that, for two pictures whose PSNRs are greater than 40 dB, a difference perceived by a user on the two pictures is not obvious. It can be learned that the encoding method in this application does not significantly reduce rendering effect.

It should be noted that, after data form transform in the conventional technology is performed, if lossy compression is performed, accuracy of probe data obtained through decoding by the decoder side is severely affected, and subsequently, the rendering effect is severely affected. After data form transform in the encoding method corresponding to the decoding scheme in this application is performed, both lossless compression and lossy compression may be performed on processed intermediate data. As shown in FIG. 11*b*, even if lossy compression is performed on the intermediate data obtained through data form transform in the encoding method corresponding to the decoding scheme in this application, the decoder side can still obtain a high-quality picture, and the user can barely perceive a difference between rendering effect through naked eyes. However, in the encoding method corresponding to the decoding scheme in this application, after data form transform and lossy compression are performed on the probe data, a data amount is greatly reduced, a bit rate can be significantly reduced, and transmitted data can be reduced, thereby reducing a rendering delay of a client and improving user experience, especially in scenes that have high requirements on real-time performance.

Figure 12:
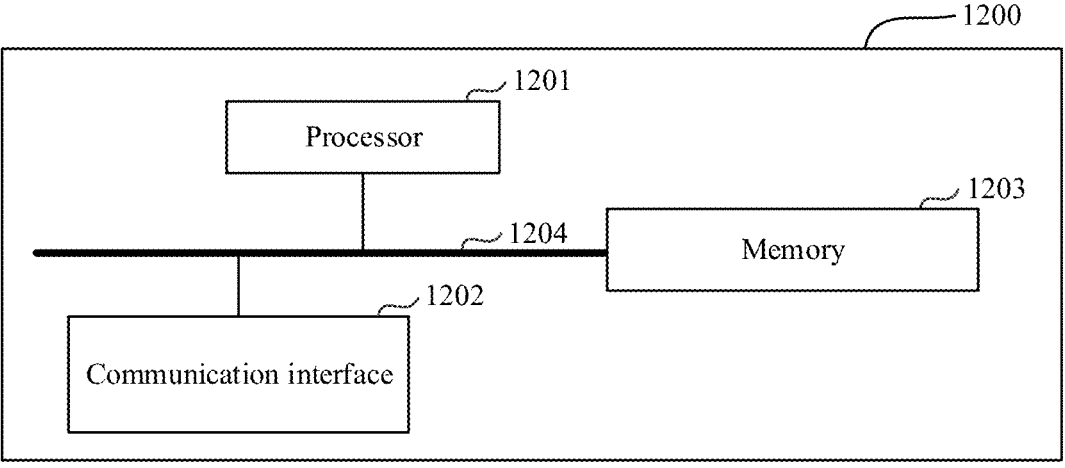
FIG. 12 is a diagram of an example of a structure of an apparatus.

For example, FIG. 12 shows an example of an apparatus 1200 according to an embodiment of this application. The apparatus 1200 may include a processor 1201 and a communication interface 1202. In one embodiment, the apparatus 1200 further includes a memory 1203.

Components of the apparatus 1200 are coupled together through a bus 1204. In addition to a data bus, the bus 1204 further includes a power bus, a control bus, and a status signal bus. However, for clear description, various types of buses in the figure are referred to as the bus 1204.

In one embodiment, the memory 1203 may be configured to store instructions in the foregoing method embodiments. The processor 1201 may be configured to execute the instructions in the memory 1203, and control the communication interface to receive/send a signal.

The apparatus 1200 may be the electronic device or a chip of the electronic device in the foregoing method embodiments.

The processor 1201 is configured to: process data, control data access and storage, issue a command, and control another component to perform an operation. The processor 1201 may be implemented as one or more processors, one or more controllers, and/or another structure available for executing a program. The processor 1201 may include at least one of a general-purpose processor, a digital signal processor (DSP), an application-specific integrated circuit (ASIC), a field programmable gate array (FPGA), or another programmable logic component. The general-purpose processor may include a microprocessor, and any conventional processor, controller, microcontroller or state machine. The processor 1201 may alternatively be implemented as a computing component, for example, a combination of the DSP and the microprocessor.

The memory 1203 may include a computer-readable storage medium, for example, a magnetic storage device (for example, a hard disk, a floppy disk, and a magnetic stripe), an optical storage medium (for example, a digital versatile disc (DVD)), a smartcard, a flash memory device, a random access memory (RAM), a read-only memory (ROM), a programmable ROM (PROM), an erasable PROM (EPROM), a register, and any combination thereof. The memory 1203 may be coupled to the processor 1201, so that the processor 1201 can read information and write the information to the memory 1203. In one embodiment, the memory 1203 may be integrated into the processor 1201, or the memory 1203 and the processor 1201 may be separated.

The communication interface 1202 may include a circuit and/or a program, to implement two-way communication between the terminal 1200 and one or more wireless network devices (for example, a router, a switch, and an access point). The communication interface 1202 includes at least one receiving circuit and/or at least one transmitting circuit. In an embodiment, the communication interface 1202 may be implemented partially or completely by a wireless modem.

All related content of the operations in the foregoing method embodiments may be cited in function descriptions of the corresponding functional modules. Details are not described herein again.

An embodiment further provides a computer-readable storage medium. The computer-readable storage medium stores computer instructions. When the computer instructions are run on an electronic device, the electronic device is enabled to perform the foregoing related method operations, to implement the decoding method in the foregoing embodiments.

An embodiment further provides a computer program product. When the computer program product is run on a computer, the computer is enabled to perform the foregoing related operations, to implement the decoding method in the foregoing embodiments.

In addition, an embodiment of this application further provides an apparatus. The apparatus may be a chip, a component, or a module. The apparatus may include a processor and a memory that are connected. The memory is configured to store computer-executable instructions. When the apparatus runs, the processor may execute the computer-executable instructions stored in the memory, to enable the chip to perform the decoding method in the foregoing method embodiments.

The electronic device, the computer-readable storage medium, the computer program product, or the chip provided in embodiments is configured to perform the corresponding method provided above. Therefore, for beneficial effect that can be achieved, refer to the beneficial effect in the corresponding methods provided above. Details are not described herein again.

Based on the foregoing descriptions of the embodiments, a person skilled in the art may understand that for the purpose of convenient and brief description, division into the foregoing functional modules is merely used as an example for description. During actual application, the foregoing functions can be allocated to different functional modules for embodiment based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiment is merely an example. For example, the module or division into the units is merely logical function division and may be other division during actual embodiment. For example, a plurality of units or components may be combined or integrated into another apparatus, or some features may be ignored or not performed. In addition, the displayed or discussed mutual coupling or direct coupling or communication connection may be implemented through some interfaces. The indirect coupling or communication connection between the apparatuses or units may be implemented in an electronic form, a mechanical form, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

Any content in embodiments of this application and any content in a same embodiment can be freely combined. Any combination of the foregoing content falls within the scope of this application.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the operations of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing describes embodiments of this application with reference to the accompanying drawings. However, this application is not limited to the foregoing embodiments. The foregoing embodiments are merely examples, but are not limitative. Inspired by this application, a person of ordinary skill in the art may further make modifications without departing from the purposes of this application and the protection scope of the claims, and all the modifications shall fall within the protection of this application.

Methods or algorithm operations described in combination with the content disclosed in embodiments of this application may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, to enable the processor to read information from the storage medium and write the information into the storage medium. It is clear that the storage medium may be a component of the processor. The processor and the storage medium may be disposed in an ASIC.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium, where the communication medium includes any medium that enables a computer program to be transmitted from one place to another. The storage medium may be any available medium accessible to a general-purpose computer or a special-purpose computer.

The foregoing describes embodiments of this application with reference to the accompanying drawings. However, this application is not limited to the foregoing embodiments. The foregoing embodiments are merely examples, but are not limitative. Inspired by this application, a person of ordinary skill in the art may further make modifications without departing from the purposes of this application and the protection scope of the claims, and all the modifications shall fall within the protection of this application.

What is claimed is:

1. A decoding method applied to a first device, wherein the method comprises:

obtaining a bitstream comprising intermediate data;

decoding the bitstream to obtain the intermediate data; and performing data form conversion comprising domain conversion on the intermediate data to obtain probe data that corresponds to one or more probes in a three-dimensional scene, wherein the probe data is for determining a shading effect of an object in the three-dimensional scene in a rendering process, wherein the performing data form conversion further comprises:

performing first processing on the intermediate data to obtain converted data; and performing second processing on the converted data to obtain the probe data, wherein, in association with the first processing being the domain conversion, the second processing comprising at least one of a dequantization or a first manner rearrangement; and in association with the second processing being the domain conversion, the first processing comprising at least one of the dequantization or the first manner rearrangement.

2. The method of claim 1, wherein the performing data form conversion on the intermediate data to obtain probe data further comprises:

after the second processing is performed on the converted data and before the probe data is obtained, performing third processing on the converted data obtained through second processing, wherein the third processing comprises at least one of the following:

the domain conversion;

the dequantization; or the first manner rearrangement.

3. The method of claim 1, wherein the intermediate data is data on a YUV plane, and before the performing first processing on the intermediate data, the method further comprises:

performing a second manner rearrangement on the intermediate data, wherein the second manner rearrangement comprises extracting the data from the YUV plane.

4. The method of claim 3, wherein the second manner rearrangement further comprises arranging the data extracted from the YUV plane into a two-dimensional picture.

5. The method of claim 1, wherein when the intermediate data is intermediate data corresponding to illumination data, the first manner rearrangement comprises at least one of the following:

adding a channel to the intermediate data corresponding to the illumination data;

converting the intermediate data corresponding to the illumination data into a data storage format of the first device; or performing a dimension conversion on the intermediate data corresponding to the illumination data.

6. The method of claim 1, wherein, when the intermediate data is intermediate data corresponding to visibility data comprising a plurality of groups of channels, the first manner rearrangement comprises at least one of the following:

combining the plurality of groups of channels;

converting the intermediate data corresponding to the visibility data into a data storage format of the first device; or performing dimension conversion on the intermediate data corresponding to the visibility data.

7. The method of claim 1, wherein the performing the data form conversion on the intermediate data to obtain probe data further comprises:

performing the data form conversion on the intermediate data based on first attribute data obtained by decoding the bitstream to obtain the probe data.

8. The method of claim 1, wherein the domain conversion comprises at least one of the following:

conversion from a normalized domain to a non-normalized domain;

conversion from a non-linear domain to a linear domain;

conversion from a YUV domain to an RGB domain;

conversion from an XYZ domain to an RGB domain; or conversion from a Lab domain to an RGB domain.

9. The method of claim 1, wherein
the bitstream further comprises attribute data of the probe, wherein the attribute data comprises at least one of first attribute data for the data form conversion or second attribute data used in the rendering process.

10. The method of claim 1, wherein when the intermediate data comprises the intermediate data corresponding to illumination data and the intermediate data corresponding to visibility data, the bitstream further comprises bitstream structure information comprising at least one of a location of the intermediate data corresponding to the illumination data or a location of the intermediate data corresponding to the visibility data.

11. A first device, comprising:
at least one processor; and
a memory storing instructions that, when executed by the at least one processor, cause the first device to:
  obtain a bitstream comprising intermediate data;
  decode the bitstream, to obtain the intermediate data; and
  perform data form conversion comprising domain conversion on the intermediate data to obtain probe data that corresponds to one or more probes in a three-dimensional scene, wherein the probe data is for determining a shading effect of an object in the three-dimensional scene in a rendering process, wherein the first device is further to:
    perform first processing on the intermediate data to obtain converted data;
    perform second processing on the converted data to obtain the probe data, wherein
    in association with the first processing being the domain conversion, the second processing comprising at least one of a dequantization or a first manner rearrangement; and
    in association with the second processing being the domain conversion, the first processing comprising at least one of the dequantization or the first manner rearrangement.

12. The first device of claim 11, wherein the instructions, when executed by the at least one processor, cause the first device to:
  perform third processing on the converted data obtained through second processing after the second processing is performed on the converted data and before the probe data is obtained, wherein the third processing comprises at least one of the following:
  the domain conversion;
  the dequantization; or
  the first manner rearrangement.

13. The first device of claim 11, wherein the intermediate data is data on a YUV plane, and the instructions, when executed by the at least one processor, cause the first device to:
  perform a second manner rearrangement on the intermediate data before first processing is performed on the intermediate data, wherein the second manner rearrangement comprises extracting the data from the YUV plane.

14. The first device of claim 11, wherein when the intermediate data is intermediate data corresponding to illumination data, the first manner rearrangement comprises at least one of the following:
  adding a channel to the intermediate data corresponding to the illumination data;
  converting the intermediate data corresponding to the illumination data into a data storage format of the first device; or
  performing a dimension conversion on the intermediate data corresponding to the illumination data.

15. The first device of claim 11, wherein when the intermediate data is intermediate data corresponding to visibility data comprising a plurality of groups of channels, the first manner rearrangement comprises at least one of the following:
  combining the plurality of groups of channels;
  converting the intermediate data corresponding to the visibility data into a data storage format of the first device; or
  performing dimension conversion on the intermediate data corresponding to the visibility data.

16. The first device of claim 11, wherein the instructions, when executed by the at least one processor, cause the first device to:
  perform the data form conversion on the intermediate data based on first attribute data obtained by decoding the bitstream to obtain the probe data.

17. The first device of claim 11, wherein the bitstream further comprises attribute data of the probe, wherein the attribute data comprises at least one of first attribute data for the data form conversion or second attribute data used in the rendering process.

18. A non-transitory computer-readable storage medium, storing a computer program, and when the computer program is executed by at least one processor, cause the at least one processor to:
  obtain a bitstream comprising intermediate data;
  decode the bitstream, to obtain the intermediate data; and
    perform data form conversion on the intermediate data, to obtain probe data, wherein the probe data corresponds to one or more probes in a three-dimensional scene, and the probe data is for determining shading effect of an object in the three-dimensional scene in a rendering process, wherein the data form conversion comprises domain conversion, wherein the at least one processor is further to:
    perform first processing on the intermediate data to obtain converted data;
    perform second processing on the converted data to obtain the probe data, wherein in association with the first processing being the domain conversion, the second processing comprising at least one of a dequantization or a first manner rearrangement; and
    in association with the second processing being the domain conversion, the first processing comprising at least one of the dequantization or the first manner rearrangement.

* * * * *